Feb. 21, 1939. F. WARBURTON 2,148,002
TELEGRAPH PRINTING, RECORDING, AND LIKE APPARATUS
Filed Sept. 30, 1936 9 Sheets-Sheet 4
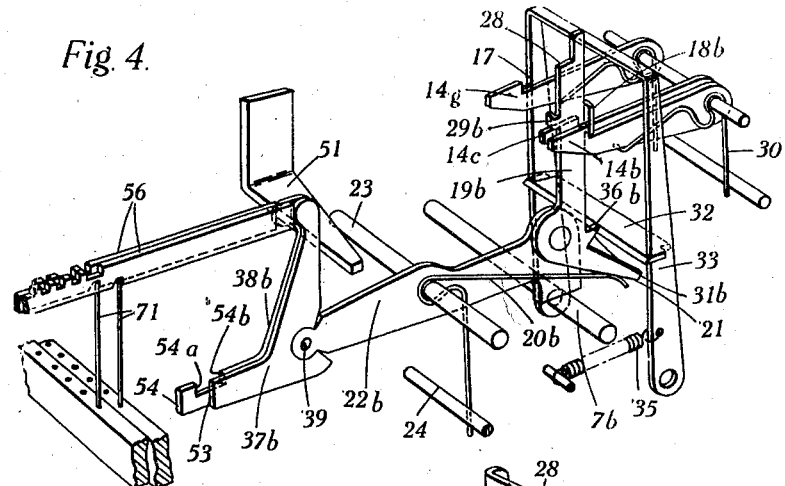
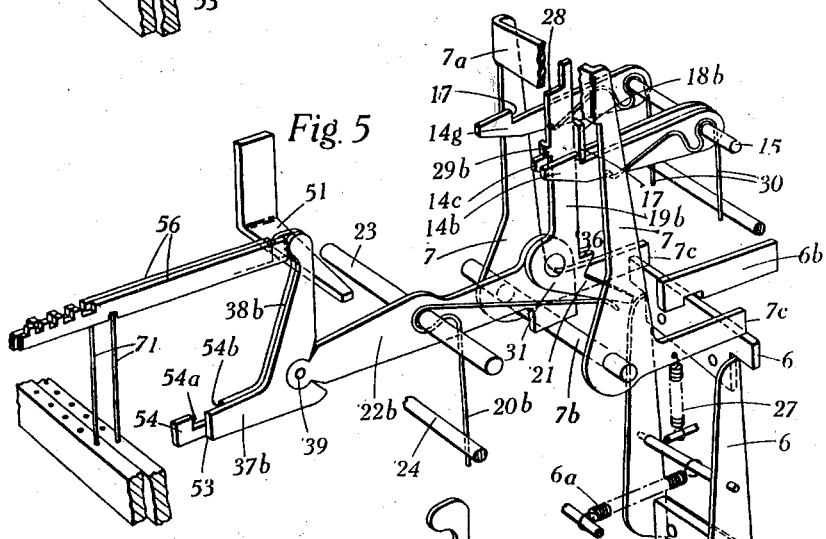
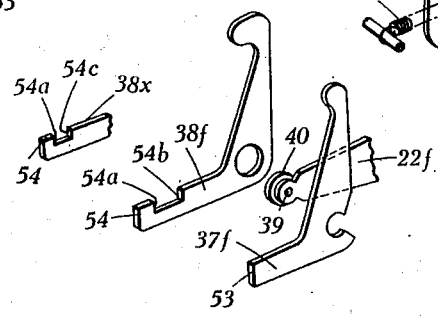
Inventor
Fred Warburton,
By Ralph B. Stuart
Associate Attorney

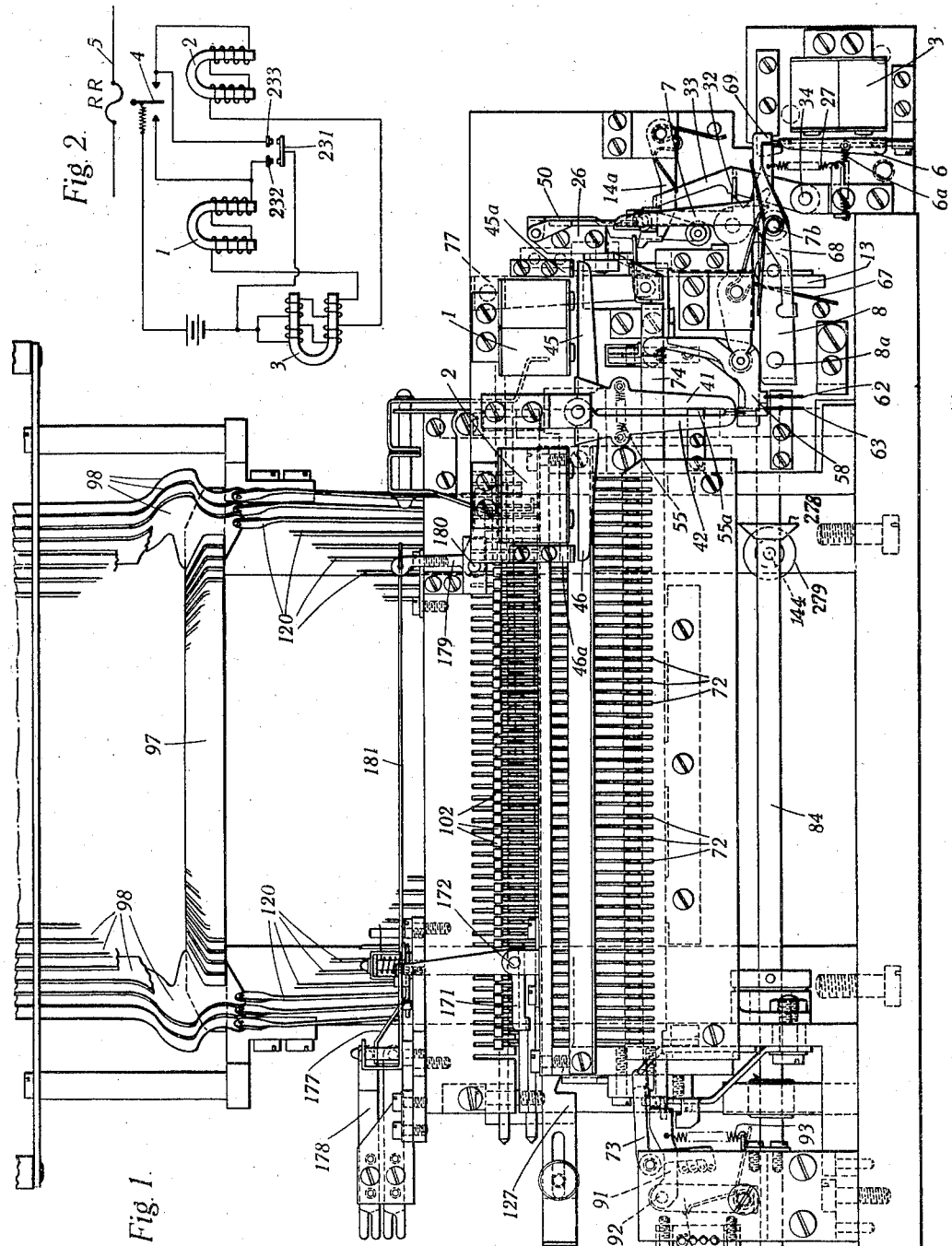

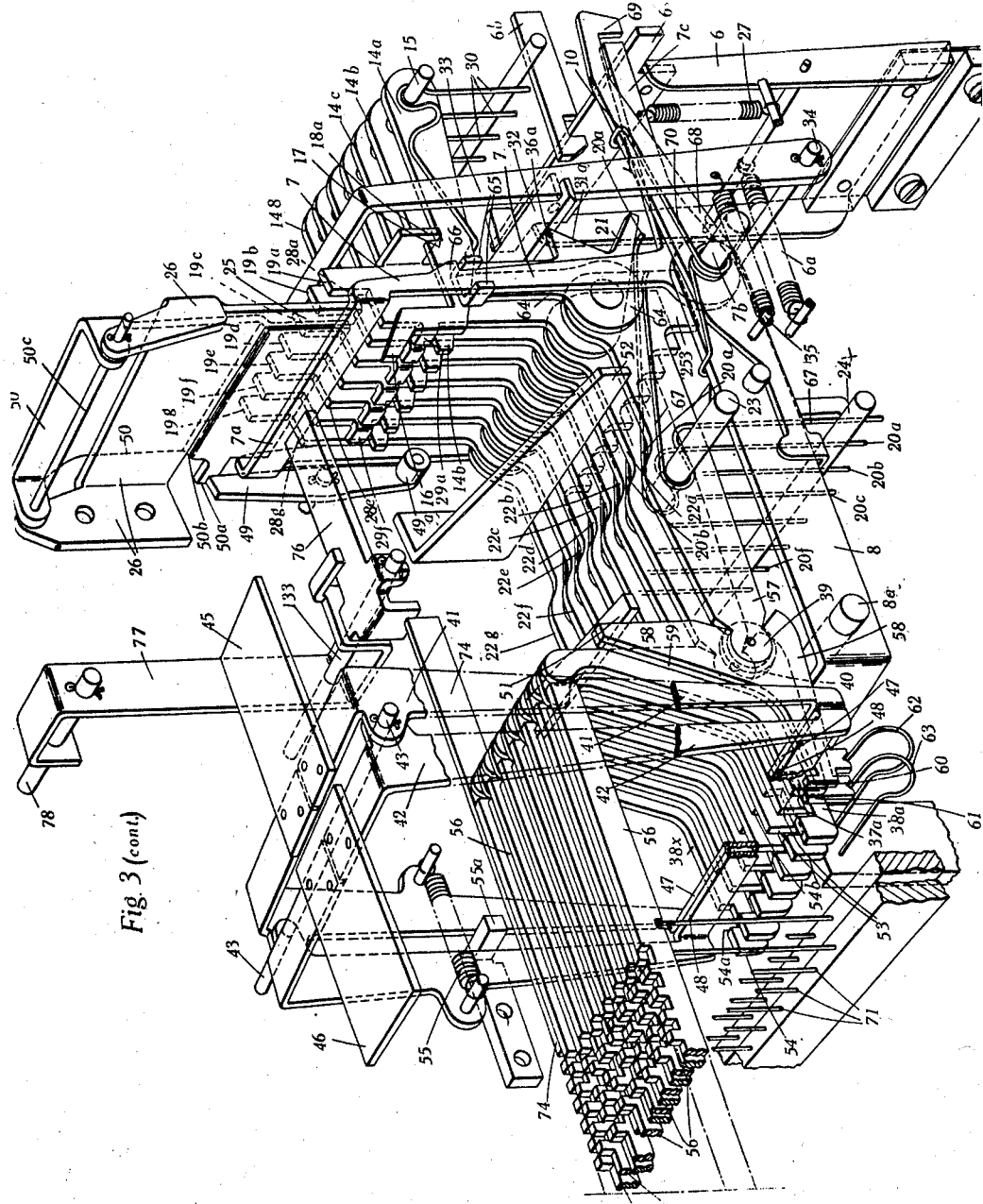

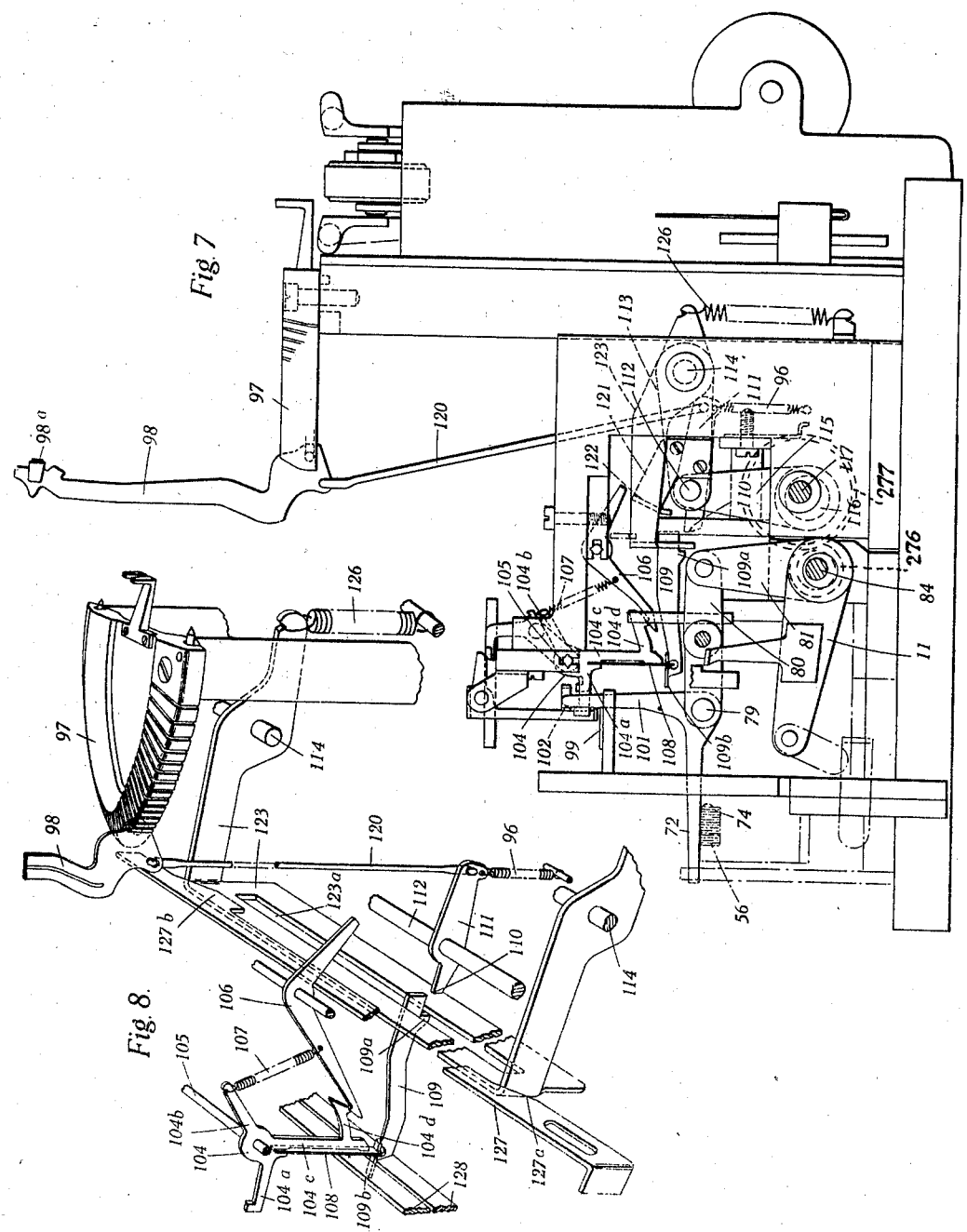

Feb. 21, 1939.   F. WARBURTON   2,148,002
TELEGRAPH PRINTING, RECORDING, AND LIKE APPARATUS
Filed Sept. 30, 1936   9 Sheets-Sheet 6

Inventor
Fred Warburton,
By Ralph B. Stewart
Associate Attorney.

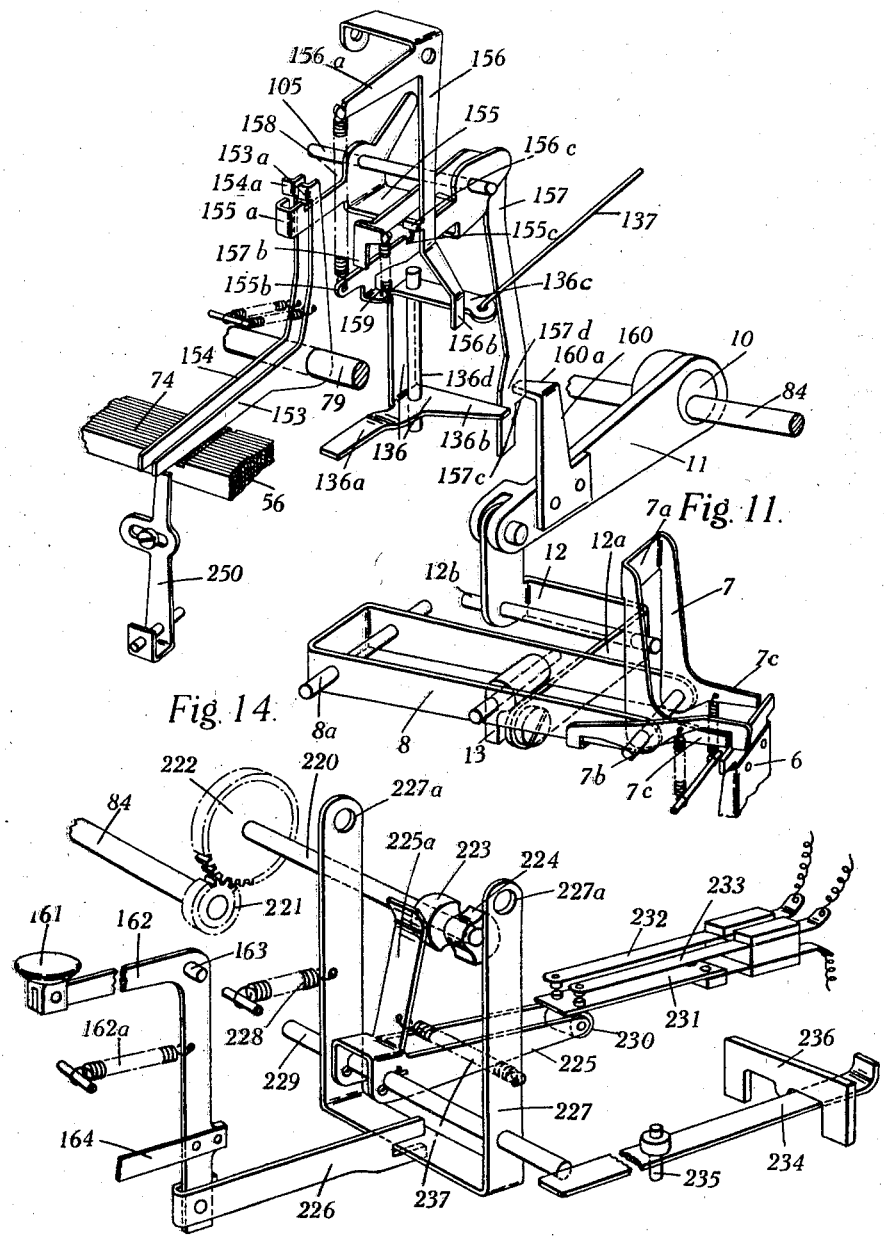

Feb. 21, 1939.　　　F. WARBURTON　　　2,148,002
TELEGRAPH PRINTING, RECORDING, AND LIKE APPARATUS
Filed Sept. 30, 1936　　9 Sheets-Sheet 9

INVENTOR:-
Fred Warburton
BY
Ralph B. Stewart
ATTORNEY.

UNITED STATES PATENT OFFICE 2,148,002

TELEGRAPH PRINTING, RECORDING, AND LIKE APPARATUS

Fred Warburton, London, England, assignor to Cable and Wireless Limited, London, England, a British company Application September 30, 1936, Serial No. 103,437
In Great Britain October 8, 1935

38 Claims. (Cl. 178—36)

This invention relates to telegraph apparatus and is particularly concerned with apparatus which is arranged to deal with signals in unequal length codes, such as cable Morse code, in which the various signals are composed of different numbers of units. The invention, however, is also applicable to apparatus which deals with equal length codes such as five-, six- or more unit codes. Further, apparatus embodying the invention may be arranged to operate on the start-stop principle or it may be arranged to deal with code transmitted and received on continuously-driven mechanism.

An object of the invention is to provide mechanism for setting up permutations for use in telegraph printing or perforating mechanism, the permutations consisting of the setting of the positions of a number of permutation members such as combs. Thus, one of the principal features of the invention consists of permutation setting mechanism comprising an actuator which is reciprocated constantly and which is arranged under the control of a signal to be brought into operative relationship with a number of interposed members in succession. This result may be effected by a kind of unlatching of the members in succession of freeing them to come into the operative path of the actuator so long as signal impulses are applied to the apparatus. In the case of a variable length code, such as cable Morse code, each interposed member, after performing its function, relatches itself and unlatches the next of the series of interposed members for it, in its turn, to be allowed to come under the sphere of influence of the actuator. The mechanism is arranged so that when a condition exists corresponding to the sending or reception of spheres in telegraphy, the successive unlatching and latching of the different interposed members is interfered with and is not allowed to proceed and also when the spacing conditions follows on the completion of the impulse or impulses forming a character, all the interposed members are reset and the initial or zero state of affairs is produced once more ready for the next signal.

A further object of the invention is to provide a translating mechanism which enables permutations set up on permutation members, such as combs, in telegraph printing apparatus or like apparatus to be utilised for effecting printing or for carrying out a similar mechanical function, and, in particular, it aims at enabling such operations to be carried out when the incoming signals consist of signals of an unequal length code such as the cable Morse code or Wheatstone Morse code. In the case of equal length codes such as five-unit, six-unit code, and so forth, the permutations set up can be dealt with and translated at equal intervals because each character is constituted by the same number of impulses. The matter, however, is not so simple in the case of unequal length codes because the characters consist of unequal numbers of signal elements. The invention, therefore, provides constantly-driven exploring members, which, for example, may conveniently take the form of pivoted blades, which are arranged to coact with the permutation combs or other permuation members at the end of every centre-hole unit. Thus, the permutation combs are set at the end of each signal in the usual manner to allow the entrance or passage of a single one of these exploring members which control the actuation of the type bars and so forth. However, if the permutation members are thus explored once per centre-hole period in this way, it is clear that, without further provision, a character would be printed inevitably after the first impulse of each signal, the character being an e if the impulse is a dot and a t if it is a dash. To obviate this difficulty, a space comb or other permutation member is provided which prevents the printing operation until, when upon the completion of a character signal, this space comb has been displaced to act as a gate for the appropriate exploring member.

The invention is also concerned with printing, typewriting, recording and like mechanism, arranged to be operated under the control of permutation settings, and according to a further aspect of the invention, printing, typewriting or like mechanism is controlled from a series of constantly actuated exploring members which cooperate with a series of permutation members such as combs, the exploring members being associated with a mechanism arranged to select the appropriate type members to be power-driven from a separate source of power such as an electric motor.

The series of exploring members may be pivoted about a common spindle and arranged so that each one which is not selected is caused to execute one species of motion, while the member that is selected undergoes another species of motion. Thus when the exploring members cooperate with the permutation members, those exploring members that are not selected may be caused to rock as a result of contact with the permutation members while the selected exploring member enters a gate or the like formed as a result of the permutation members being set so as to bring slots in the permutation members into alignment.

Further objects and aspects of the invention will appear from the following description.

In order that the invention may be clearly understood and readily carried into effect, telegraph receiving apparatus constructed in accordance therewith will now be described, by way of example, with reference to the accompanying drawings in which:

Figure 1 is a front elevation of the apparatus;

Figure 2 is a circuit diagram showing certain circuits including three electromagnets, seen in Figure 1;

Figure 4 is a perspective view of certain details of the mechanism shown in Figure 3;

Figure 5 is a view similar to Figure 4 but showing a somewhat different selection of details;

Figure 6 is an exploded perspective view of some parts seen in Figures 3, 4 and 5;

Figure 7 is a somewhat diagrammatic sectional elevation of type selecting and actuating mechanism contained in the apparatus;

Figure 8 is a perspective view of certain details of the mechanism shown in Figure 7;

Figure 11 is a perspective view of word spacing mechanism incorporated in the apparatus;

Figure 14 is a perspective view of further mechanism incorporated in the apparatus.

Figure 3:
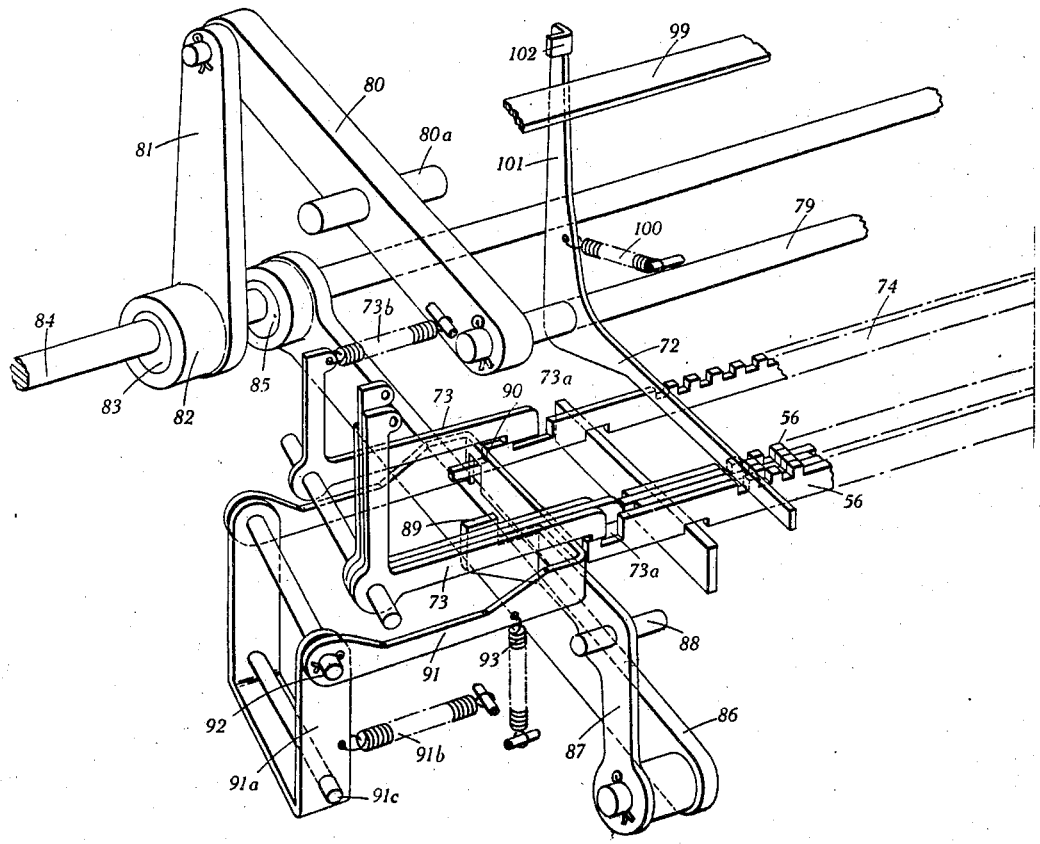
Figure 3 is a perspective view of certain selector and permutation setting mechanism contained in the apparatus.

The apparatus illustrated may be controlled by perforated tape fed through a distant transmitter, the tape being perforated in accordance with cable Morse code. However, although the apparatus is particularly suited for this unequal length code, it may also be operated by signals in equal length code, such as five- or six-unit code. Nevertheless, in the following description the operation of the apparatus will be described on the assumption that the signals received are derived from tape perforated in accordance with cable Morse code.

Referring first to the selector and permutation setting mechanism (see Figures 1 to 6), this includes three electromagnets (Figures 1 and 2) consisting of a magnet 1 which is energised upon receipt of an impulse representing a dot, a magnet 2 which is energised upon receipt of an impulse representing a dash and a space magnet 3 which is energised whenever a marking impulse i. e., a dot impulse or a dash impulse is received. The magnets 1, 2 and 3 are controlled through the medium of a tongue 4 (Figure 2) of a receiving relay RR. The tongue 4 rests in a central or neutral position when a spacing condition obtains but is swung to right or left when a marking impulse passes along the line 5. The direction of the current impulse in the line 5 determines in which direction the tongue 4 is moved and consequently whether the dot magnet 1 or the dash magnet 2 is energised. In both cases the space magnet 3 is energised. This space magnet 3, upon being energised, attracts an armature 6 (Figures 1, 3 and 5) and swings it, against the action of a spring 6a, about a horizontal axis at its lower end at which it is anchored by a resilient leaf. The armature 6 controls the movement of an actuator 7 which consists of two levers connected together by a transverse bar 7a. This actuator 7 is pivoted about the axis of a horizontal spindle 7b to a frame 8 arranged to be rocked about the axis of a horizontal spindle 8a. This frame 8 is rocked up and down once for each centre-hole interval of the tape from which the signals are received. The mechanism for rocking the frame 8 is shown in Figure 11 and includes a shaft 84, carrying an eccentric 10, which is rotated at a speed such that it makes one revolution during the time interval between the arrival of two consecutive centre holes at the exploring device associated with the tape. The eccentric 10 lies in a corresponding bearing at one end of a connecting link 11 pivoted at its other end to a frame 12, pivoted about the axis of a horizontal spindle 12b. The latter is formed with an arm 12a which is connected to the frame 8 through the medium of a universal joint including a member 13 pivoted respectively to the frame 12 and to the frame 8 about axes at right angles.

Now supposing a spacing condition obtains so that the armature 6 is not attracted by the space magnet 3, then the upper end of the armature 6 lies in the path of two projections 7c on the actuator 7 so that when the latter is carried downwards by the rocking frame 8, the engagement of the armature 6 with the projections 7c causes the actuator 7 to be swung about its axis 7b in an anti-clockwise direction as seen in Figures 3 and 5. The result of this is that during its downward movement, the actuator 7 has no effect on the permutation setting mechanism except that during its first downward movement after a marking condition it swings a latching lever 14a about the axis of a spindle 15 due to the engagement of the transverse bar 7a of the actuator with an inclined edge on a projection 16 forming part of the latching lever 14a. This downward movement of the latching lever 14a causes a shoulder 17, formed on the latching lever 14a, to be moved out of engagement with a lug 18a formed on an interposed member 19a. The result of this is that the interposed member 19a is swung in an anti-clockwise direction (Figure 3) by a wire spring 20a which bears against a toe 21 formed at the lower end of the interposed member 19a. The interposed member 19a is one of seven such interposed members 19a ... 19g. These interposed members are pivoted respectively to seven rocking plates 22a ... 22g and the rocking plates are pivoted about a common horizontal spindle 23. The spring 20a is bent round the spindle 23 and is prevented from moving bodily in a clockwise direction (Figure 3) by a cross bar 24. Wire springs 20b ... 20g, associated respectively with the interposed members 19b ... 19g, are arranged in a similar fashion.

During a spacing condition the actuator 7 is simply raised and lowered by the frame 8 and after having caused the latching lever 14a to unlatch the interposed member 19a it has no further action on the interposed members until a marking impulse is received. At the top of its stroke, the transverse bar 7a of the actuator is in contact with a downwardly extending projection 25 formed on a fixed bracket 26, but as soon as the projections 7c encounter the top of the armature 6 near the beginning of the downward stroke of the actuator 7, the latter is swung against the action of a spring 27, about the axis of the spindle 7b so that the transverse bar 7a is not only moved away from the projection 25 but also clears all the interposed members including the unlatched one 19a, and moves downwards and then upwards without touching these. However, as soon as a marking impulse is received, the space magnet 3 attracts the armature 6 against the action of the tension spring 6a so that the armature does not coact with the projections 7c on the actuator 7. The result of this is that the actuator 7 is lowered and raised in a different path, due to the fact that the spring 27 is permitted to hold the transverse bar 7a continuously against the fixed projection 25. The armature 6 of the space magnet is locked in its unattracted position (by means described below) during the major portion of each complete oscillation of the actuator 7 while a spacing condition obtains, but is unlocked each time the actuator 7 reaches its uppermost position. Thus when a marking condition arises, the armature 6 is permitted to swing towards the space magnet 3 the next time the actuator 7 approaches the top of its stroke. Then, during its next downward stroke the transverse bar 7a of the actuator 7 bears on a shoulder 28a formed on the interposed member 19a which, having been unlatched and moved forward by the spring 20a, lies in the marking path of the transverse bar 7a. Thus the associated rocking plate 22a is swung about the spindle 23 as the actuator 7 presses the interposed member 19a downwards. During its downward movement a lug 29a, formed on the interposed member 19a bears on one end of a latch member 14b associated with the next interposed member 19b. The result of this is that the interposed member 19b is unlatched and swung by its associated spring 20b in an anti-clockwise direction (Figures 3 to 5) so that it is ready to be moved downwards by the actuator 7 during the next downward stroke of the latter, provided that a spacing condition does not arise before this stroke takes place. There are, in fact, five further latching levers 14c ... 14g associated respectively with the interposed members 19c ... 19g. The latching levers 14b ... 14g are very similar to the latching lever 14a except that none of them is provided with an extension 16 for co-operation with the transverse bar 7a of the actuator 7. From the foregoing it will be seen, generally, that the arrangement is that when one of the interposed members 19a ... 19f is pushed downwards by the actuator 7, the next interposed member 19b ... 19g is automatically released by its associated latching lever 14b ... 14g so that it takes up a position ready to be depressed by the actuator 7 during the next downward stroke of the latter. Returning to the interposed member 19a, when this is pushed downwards a bevelled edge 31a formed thereon snaps past a bevelled edge formed on a cross bar 32, fixed to a re-latching frame 33, arranged to rock about the axis of a horizontal spindle 34. The frame 33 is loaded by a spring 35 so that the frame 33 always tends to swing in an anti-clockwise direction (Figures 3 and 4) and bears against the back edges of the interposed members that have not been unlatched. As the interposed member 19a is allowed to rise, due to the upward movement of the actuator 7, a horizontal edge 36a, formed on the interposed member 19a, engages beneath the cross bar 32 on the frame 33, so that the interposed member 19a is caused to swing about the pivot by which it is connected to the rocking plate 22a while the edge 36a turns on the cross bar 32 which acts as a fulcrum, the interposed member being thus swung back to its initial position. As soon as the interposed member 19a reaches this position the latching lever 14a engages the lug 18a on the interposed member 19a and holds the latter until the transverse bar 7a of the actuator 7 again engages the projection 16 on the latching lever 14a at the beginning of the next spacing condition. Seven wire springs 30 (similar to the wire springs 20a ... 20g), one for each of the latching levers 14a ... 14g, are arranged to hold the latching levers in their latching positions.

It will be seen that the interposed members, starting with the interposed member 19a, are unlatched, actuated, and then latched again in succession. However, as previously indicated, the operations of the interposed members overlap because, with the exception of the first interposed member 19a, each one is unlatched as a direct result of the actuation of the previous one that was unlatched. In the case of cable code, not all the interposed members 19a ... 19g are unlatched for each signal but the number of interposed members unlatched for each signal is the same as the number of impulses in that signal. Thus, if the signal received is a single impulse signal, that is e or t, only the first interposed member 19a will be actuated, but usually, of course, the signal received will result in more than one member being actuated, i. e., being depressed by the actuator 7. As explained above, when any interposed member 19a ... 19g is actuated, this results in the next interposed member being unlatched so that, usually, after the appropriate number of interposed members have been actuated in accordance with a received signal, there will be one interposed member which is unlatched but which is not depressed by the actuator 7 so that it cannot be returned to its initial position as a result of the engagement of its edge 36 with the cross bar 32 on the re-latching frame 33. After the last interposed member, assuming this not to be the member 19g, has been actuated during the last impulse of a received signal, the transverse bar 7a of the actuator 7 will follow its forward or "spacing" path during its next downward movement on account of the engagement of the projections 7c with the armature 6, the latter having been released immediately upon the start of the first spacing interval following the last marking interval of the signal. The forward movement of the actuator 7 due to the engagement of the projections 7c with the armature 6 results in one edge of one of the vertical parts of the actuator 7 pushing on a roller 49a carried by the lower end of a lever 49, pivoted about a horizontal axis at its centre. When this happens the upper end of the lever 49 pushes on a lug 50a formed on a plate 50, pivoted about the axis of a horizontal spindle 50c carried by the fixed bracket 26. The plate 50 is thus caused to swing about its axis and bear upon the remaining unlatched interposed member 19b ... 19g so as to move the latter back to the position in which it is engaged and held by its associated latching lever (14b ... 14g). The plate 50 hangs down behind the fixed bracket 26 and is bent forwards and downwards at 50b so that it extends downwards in front of those parts of the interposed members that are above their shoulders 28.

When marking conditions obtain the path of the actuator 7 is such that it does not cause the lever 49 to act on the plate 50.

The interposed members 19a ... 19g, of course, are all the same shape except that the last interposed member 19g is not provided with a lug 29a ... 29f because there is no further interposed member to be unlatched upon actuation of the member 19g.

Each of the rocking plates 22a ... 22f is pivoted at its end remote from its associated interposed member to a pair of L-shaped levers 37a ... 37f, 38a ... 38f, while the rocking plate 22g has a single L-shaped lever 38x pivoted to its end. The end of each rocking plate 22a ... 22g is formed with a circular part 39 which fits into a corresponding circular recess in the associated one of the L-shaped levers 37a ... 37f and 38x. The end of each rocking plate 22a ... 22f also carries a disc 40 which fits into a corresponding hole in the associated one of the L-shaped levers 38a ... 38f. The horizontal arms of the L-shaped levers 37a ... 37g, 38a ... 38g and 38x are formed so as to co-operate with frames 41 and 42 pivoted together about the axis of a spindle 43. An armature 45 for the dot magnet 1 is fixed to the frame 41, while the frame 42 carries the armature 46 associated with the dash magnet 2. The amount of movement of the armatures 45 and 46 is limited by stops 45a and 46a (Figure 1). Incidentally, also, the movement of the space magnet armature 6 is limited by the ends of a slot in a fixed member 6b. The arrangement of the frames 41 and 42 is such that if the magnet 1 is energized when one of the rocking plates 22a ... 22f is turned about the axis of the spindle 23, a cross piece 47, forming part of the frame 41, is engaged by one of the L-shaped levers 37a ... 37f associated with this particular rocking plate so that this L-shaped lever is turned about the axis of the circular part 39 formed on the rocking plate. The associated one of the L-shaped levers 38a ... 38f, however, is not engaged by the frame 41 and is simply raised bodily by the associated rocking plate without being turned. On the other hand, in the event of the armature 46 being attracted by the dash magnet 2 when one of the rocking plates 22a ... 22f is turned, the associated one of the L-shaped levers 38a ... 38f is turned about its axis by a cross piece 48 on the frame 42, while the associated one of the levers 37a ... 37f is not turned. The L-shaped levers 37a ... 37g, 38a ... 38g and 38x are held against turning in a clockwise direction, as seen in Figure 3, beyond the positions which they take up when they are idle, by a fixed bar 51. Further a fixed bar 52 limits the upward movement of those ends of the rock-plates 22a ... 22g that carry the interposed members 19a ... 19g. The cross pieces 47 and 48 of the armature frames 41 and 42 are located so that if the L-shaped levers 37a ... 37f and 38a ... 38f were raised when neither the dot magnet 1 nor the dash magnet 2 was energized, the cross pieces 47 and 48 would enter gaps between ends 53 of the L-shaped levers 37a ... 37f and shoulders 54a on the L-shaped levers 38a ... 38f so that these L-shaped levers would not be turned about their axes. Further, the L-shaped lever 38x is formed so that, if the rocking plate 22g was rocked so as to raise the L-shaped lever 38x when neither the dot magnet 1 nor the dash magnet 2 was energized, the cross pieces 47 and 48 would enter a notch (Figure 6) between shoulders 54a and 54c, in the L-shaped lever 38x so that this also would not be turned about its axis. When the armature 46 is attracted, the cross piece 48 on its frame 42 engages the top of a part 54 of the one of the L-shaped levers 38a ... 38f that is raised as a result of the actuator 7 being caused to act on the associated one of the interposed members. The associated L-shaped lever 37a ... 37f is unaffected because, in this case, the cross pieces 47 and 48 of the frames 41 and 42 both lie beyond the ends 53 of the L-shaped levers 37. When the armature 45 is attracted by the magnet 1 the cross piece 47 of the frame 41 lies above the horizontal part of the one of the L-shaped levers 37a ... 37f that is raised, so that this lever is turned about its axis. The associated L-shaped lever 38a ... 38f is not turned, in this case, because both the cross pieces 47 and 48 lie above gaps in edges of the L-shaped levers 38a ... 38g. In the case of each L-shaped lever 38a ... 38f this gap extends between its shoulder 54a and a shoulder 54b. When a spacing condition obtains the frames 41 and 42 are held in their central or neutral position by a spring 55. A stop 55a prevents one frame from moving when the other frame is moved by its associated magnet. The gap between the shoulders 54a and 54c in the L-shaped lever 38x is shorter than the gaps in the L-shaped levers 38a ... 38f and is such that, if the armature 45 is attracted, when the L-shaped lever 38x is raised, the lever is turned about its axis due to the cross piece 47 of the frame 41 engaging a part of the L-shaped lever 38x on one side of the gap, while if, on the other hand, the armature 46 is attracted, the cross piece 48 engages the part 54 on the other side of the gap. Thus, whenever the rocking plate 22g is rocked as a result of the actuator 7 acting on the interposed member 19g, the consequent raising of the L-shaped lever 38x results in this being turned about its axis, whether the impulse received represents a dot or a dash. The L-shaped lever 38x serves a particular function described below.

The L-shaped levers 37a ... 37f, 38a ... 38f are arranged to act respectively on twelve permutation combs 56, upon the arrangement of which depends the particular character that is to be printed, while the L-shaped lever 38x is arranged to act on an additional comb 251. However, before dealing with these combs it may be mentioned that means are provided for locking the armature of the magnets 1 and 2 in position during each centre-hole interval. Thus, an eighth rocking plate 57 is mounted on the spindle 23. This rocking plate is similar to the rocking plate 22a ... 22g and carries L-shaped levers 58 and 59 at its end. These L-shaped levers 58 and 59 are mounted on the rocking plate 57 in the same way as the L-shaped levers 37a ... 37f and 38a ... 38f are mounted on the rocking plates 22a ... 22f, but the levers are not associated with any combs and the ends of their horizontal parts are formed somewhat differently from the ends of the horizontal parts of the L-shaped levers 37a ... 37f and 38a ... 38f. Thus, the end of the lever 58 is formed with a small vertical lug 60, while the end of the lever 59 is formed with a small vertical lug 61. These lugs 60 and 61 are so disposed that if the L-shaped levers 58 and 59 are raised by the rocking plate 57 when the magnets 1 and 2 are not energized, that is to say, when the frames 41 and 42 are in their neutral positions, the lugs 60 and 61 are moved into positions such that they lie one on each side of the two cross pieces 47 and 48 of the armature frames 41 and 42. If, however, the dot magnet 1 is energized when the L-shaped levers 58 and 59 are raised, the cross piece 47 of the armature frame 41 moves to the side of the lug 60 remote from the lug 61 so that the lug 60 is raised to a position between the cross pieces 47 and 48 of the armature frames 41 and 42 and holds the armature frame 41 in the position which it takes up upon energization of the magnet 1, until the L-shaped levers 58 and 59 are lowered. In the event of the dash magnet 2 being energized, the cross piece 48 of the armature frame 42 is moved to the side of the lug 61 remote from the lug 60, so that when the L-shaped levers 58 and 59 are raised, the lug 61 moves to a position between the cross pieces 47 and 48 of the armature frames 41 and 42 and holds the armature frame 42 in the position which it takes up when the dot magnet 1 is energized until the plates 58 and 59 are lowered. Hairpin springs 62 and 63 engage small V-shaped notches formed respectively in lugs on the lower edges of the L-shaped levers 58 and 59. These hairpin springs 62 and 63 control the paths in which the lugs 60 and 61 move, maintaining these paths constant at all times when the apparatus is working normally, but permitting the L-shaped levers 58 and 59 to yield in the event of any abnormal contact between the lugs 60, 61 and the cross pieces 47 and 48 of the armature frames 41 and 42. The L-shaped levers 58 and 59 are raised and lowered each time the actuator 7 is lowered and raised. Thus, the rocking plate 57 has a member 64 pivoted to its end remote from the L-shaped levers 58 and 59. The member 64 is formed on its upper end with two lateral lugs 65 which lie one on each side of the vertical parts of the actuator 7. When this vertical part of the actuator 7 is lowered, a lug 66, formed thereon, presses on one of the lugs 65 and moves the member 64 downwards so that the L-shaped levers 58 and 59 are raised. The return movement of the rocking plate 57 is positively insured by the engagement of the spindle 7b with a heel 253 formed on the plate 57, during the upward movement of the actuator 7. The rocking plates 22a . . . 22g are formed with similar heels for the same purpose.

When a spacing condition obtains at the beginning of a centre-hole interval and the space magnet 3 becomes energized during this interval, the armature 6 of the space magnet 3 is (as previously indicated) positively held against movement until the end of the interval. This is because a lever 68, having a downwardly projecting lug 69 on one end is caused to swing downwards with the reciprocating frame 8 so that the lug 69 engages the armature 6 and holds it against being attracted by the magnet 3 until the reciprocating frame 8 has been raised sufficiently to allow the lug 69 to clear the armature 6. The lever 68 is pivoted to the frame 8 about the axis of the spindle 7b so that when the frame 8 is swung downwards again the upper edge of the armature 6, which now lies in the path of the lug 69 on the lever 68, engages the end of the lug 69 and causes the lever 68 to swing about the axis of the spindle 7b relatively to the frame 8 against the action of a spring 70. It will be seen, therefore, that the lever 68 locks the armature 6 in its unattracted position during each centre-hole interval when a spacing condition obtains but does not lock the armature 6 in its attracted position when a marking impulse occurs. The armature 6 is, in fact, locked in its attracted position by the ends of the projections 7c on the actuator 7 which, during much of each marking oscillation of the actuator 7, engages one face of the upper end of the armature 6.

Returning to the permutation combs 56, these are arranged to be thrust longitudinally against the action of wire springs 71 by the L-shaped levers 37a . . . 37f and 38a . . . 38f and each comb is formed with a number of notches in its upper edge. It will be seen that for each signal received a selection of the combs is moved longitudinally to the left, as seen in Figures 3 to 5, according to which of the L-shaped levers 37a . . . 37f and 38a . . . 38f are rocked about their axes, the setting of the combs depending upon the signal received. In extreme cases the signal may result in only one of the permutation combs being moved or in six permuation combs being moved. During spacing intervals none of the permutation combs are moved. The apparatus is, as will be appreciated from the fact that there are twelve permutation combs, only capable of dealing with signals which consist of not more than six impulses. The thirteenth comb 251 is not actuated during normal signalling and its purpose will be described below. There is, however, a fourteenth comb which is a space comb 74 that is moved automatically each time after the permutation combs 56 are set in accordance with a received signal. For each signal that necessitates the printing of a character, the notches in the combs take up relative positions such that one of a number of exploring blades 72, which are brought to bear periodically on the upper edges of the combs can enter a number of notches, one in each comb, which happen to be in register. Each exploring blade 72 can only enter the notches associated with the exploring blade when the notches are in register, that is to say, only when the signal corresponding to the respective exploring blade 72 is received.

As soon as a comb 56 is moved to the left, as seen in Figures 3 to 5, by its associated one of the L-shaped levers 37a . . . 37f or 38a . . . 38f, it is locked in the position to which it is moved by a latching lever 73 which drops into a latching notch 73a, as many latching levers 73 as there are combs 56 being provided. Thus, although when a permutation comb has been moved longitudinally by its associated one of the L-shaped levers 37a . . . 37f or 38a . . . 38f, this lever is immediately lowered so that it no longer engages the comb, the latter does not thereupon return to its initial position but is held against such return movement by its associated latching lever 73. When a complete signal has been received and the permutation combs 56 have been set in accordance with that signal, the exploring blade 72 associated with the signal cannot immediately enter the corresponding notches in the combs 56. The reason for this is that the exploring blades 72 can never enter slots in the combs 56 until the space comb 74 has been moved to the left as a result of the space condition which immediately follows each complete signal received. The exploring blades are brought to bear on the upper edges of the combs once every centre-hole interval. This is necessary because the signal received may consist of a single impulse only, as for example when the signal represents e or t. In the absence of the space comb 74, therefore, an exploring blade 72 would enter notches in the permutation combs after only one of these had been moved and before other combs corresponding to the signal being received had had time to be moved. The character e or the character t would then be printed when, in fact, the signal received corresponded to another character consisting of more than one impulse. The provision of the space comb 74, however, makes certain that no exploring blade can enter slots in the permutation combs until the character received has been completely set upon the permutation combs 56 and a spacing condition has supervened. The space comb 74 is formed with notches in its upper edge corresponding to every exploring blade, and it is not until the space comb 74 has been moved to the left and brought its notch corresponding to the signal received into register with the alined notches in all the combs 56 and so has completely opened a gate, that there is freedom for the corresponding exploring blades to enter the alined notches. It must be borne in mind that the additional comb 251 is never moved during normal signalling and is provided with notches which permit any exploring blade that happens to be selected to enter notches in the other combs when these are appropriately set. While signal impulses are being received the space comb 74 is held to the right as seen in Figure 3 by one of the wire springs 71. As soon, however, as the ensuing spacing condition intervenes after the signal impulses have all been received, the return of the armature 6 to its unattracted position results, as explained above, in the actuator 7 being raised and lowered in a somewhat different path and in the transverse bar 7a of the actuator 7 being moved to the left (as seen in Figure 3) on account of the engagement of the projections 7c on the actuator 7 with the armature 6 of the space magnet 3. This movement to the left of the transverse bar 7a of the actuator 7 causes an interposed member 76 to be pushed to the left and the end of the interposed member 76 remote from the transverse bar 7a pushing the space comb 74 to the left. The interposed member 76 is connected to one end of an arm 77 which is pivoted about the axis of a spindle 78. The space comb 74 is latched in the position to which it is moved by a latch member 73 similar to the latch members 73 associated with the permutation combs 56.

The exploring blades 72 are carried by a spindle 79 mounted on levers 80 pivoted on journals 80a. The levers 80 are pivotally connected at their ends remote from the spindle 79 to eccentric rods 81 having bushes 82 at their lower ends which embrace eccentrics 83 mounted on a continuously rotated shaft 84. The shaft 84 is rotated at such a speed that the eccentrics 83 cause the exploring blades 72 to be brought, as indicated above, into contact with the combs 56, 251 and 74 at the end of each centre hole interval.

An eccentric 85 is also fixed to the shaft 84. This eccentric 85 is embraced by a bush at one end of an eccentric rod 86, the other end of which is pivoted to a bell crank lever 87 which can swing on a journal 88. Thus, an upstanding lug 89 at one end of the bell crank lever 87 is caused to oscillate up and down by the eccentric 85. The majority of the oscillations of the bell crank lever 87 are idle, but the movement to the left of the space comb 74 causes a shoulder 90 on the space comb 74 to push a frame 91 to a position such that a transverse portion thereof lies in the path of the lug 89. The frame 91 is pivoted about the axis of a horizontal spindle 92 to a frame 91a pivoted about the axis of a horizontal spindle 91c. Thus, when the shoulder 90 of the space comb 74 is caused to push on the frame 91, the latter is able to move because the frame 91a yields, against the action of a tension spring 91b, about the axis 91c. The eccentrics 83 and 85 are arranged relatively to each other in such a way that soon after the space comb has been shifted the exploring blades 72 are brought into contact with the combs so that the selected exploring blade can enter the corresponding slots in the combs. Then, immediately following the removal of the exploring blades 72 from contact with the combs the eccentric 85 brings the lug 89 on the bell crank lever 87 into contact with the frame 91. The lug 89 then swings the frame 91 upwards, about the axis of the spindle 92, against the action of a spring 93. The frame 91 extends under the latch members 73 so that when it is raised, it lifts the latch members that are latching their associated combs. Thus, those combs that have been latched are returned by their wire springs 71 to the positions from which they were originally shifted. The latch members 73 are held in their latching positions by springs 73b which force the latch members 73 into engagement with the corresponding notches in the combs. Each exploring blade 72 is held by a spring 100, connected between an upstanding part 101 of the exploring blade and a fixed point, so that the part 101 rests against a rest 99 (common to all the exploring blades) during that part of the movement of the exploring blades that takes place before and after they engage the combs. When the exploring blades 72 engage the combs, all the blades, with the exception of any blade that can enter alined notches in the combs, are swung about the axis of the spindle 79, against the actions of their springs 100, because the blades 72 swing about the space comb 74 during continued downward movement of the spindle 79. This movement of the blades 72 results in lateral lugs 102, at the upper ends of their upstanding parts 101, traversing paths such that they do not engage lugs at the ends of arms 104a of three-armed levers 104 (Figure 7). There is one of these three-armed levers 104 associated with each exploring blade 72 and all the three-armed levers 104 are mounted to swing on a common horizontal spindle 105.

When an exploring blade 72 enters notches in the combs, its lug 102 traverses a path such that it engages the lug at the end of the arm 104a of the associated three-armed lever 104 and swings the latter about the spindle 105. The three-armed levers 104 are associated respectively with a number of hook members 106. Each hook member 106 is connected to an arm 104b of its associated three-armed lever 104 by a spring 107. When a three-armed lever 104 is turned as a result of the selection of its associated exploring blade 72 a hook 104d on an arm 104c of the three-armed member 104 engages the associated hook member 106 so that the two hooks are held latched together by their associated spring 107 even after the exploring blade has been removed from the combs. The lower arms 104c of the three-armed levers 104 carry blade springs 108, the lower extremities of which enter slots in associated slides 109. Thus, when a three-armed lever 104 is selected and turned, its blade spring 108 tends to move the associated slide 109 from left to right as seen in Figure 7. This movement may take place immediately the three-armed lever 104 is actuated but in some phases of the actuation of the mechanism the nose 110 of a type actuating lever 111 lies in the way of the right hand end of the corresponding slide 109 and holds up the movement of the slide for a short time. There are as many type actuating levers 111 as there are slides 109 and the type actuating levers 111 are mounted on a common spindle 112, carried by arms 113 pivoted about the axis of a spindle 114. The arms 113 are caused to rise and fall continuously through the medium of an eccentric link 115, one end of which embraces an eccentric 116 which is rotated continuously by a shaft 117 during the operation of the apparatus.

If, when the type actuating levers 111 are carried downwards, the nose 110 of one of them is engaged by the end of the associated slide 109, the slide 109 shoots forward as soon as the nose 110 has been moved down far enough to permit this to happen. Then, when the lever 111 is carried upwards again its nose 110 encounters the lower edge of the end of the slide 109 which is now in its path. As soon as this happens the lever 111 is swung about the axis of the spindle 112 so that its end remote from the nose 110 is raised against a spring 96 and a type connecting rod 120 pivoted to the lever 111, is pushed upwards to effect printing on a paper strip (mentioned below) by the type character 98a, born by a type lever 98. The type levers 98 are pivoted to a fixed semi-circular bracket 97. Dogs 121, fixed respectively to the arms 113 and connected by a transverse strip 122, are raised at the same time as the arms 113 are raised, and as soon as the selected type lever 98 has been actuated, the transverse strip 122 engages the tail of the hooked member 106 which has been latched to its associated three-armed lever 104 and unlatches these members so that the three-armed lever 104 is returned by the spring 107 to its normal position and pulls its associated slide 109 to the left (as seen in Figure 7).

It may be noted that the mechanism disclosed permits of operation with the shaft 117 rotated at the same speed as the shaft 84 or at half that speed. In the former case, when the shaft 117 is geared to the shaft 84 so that both these shafts rotate at the same speed and the spindle 112 is therefore reciprocated at centre-hole speed, the type-actuating levers 111 are arranged to be substantially at the bottoms of their strokes each time a selection results in one of the slides 109 being moved forward. Thus, in this condition or phase of the mechanism the nose of no selected slide 109, when it is moved to the right as seen in Figure 7, abuts against the nose 110 of the corresponding type-actuating lever 111 in the manner indicated above. On the contrary, each slide 109 upon selection is moved forward immediately to the position in which its lower edge lies in the path of the nose 110 of the corresponding lever 111 so as to be encountered by the top of the nose 110 during the upward stroke of the spindle 112. In the alternative case in which the shaft 117 is geared to the shaft 84 so as to run at half its speed, which is desirable when signals are being received at high speed, as it enables the printing mechanism to work at a reasonably slow speed while the selector mechanism is working fast, it will be seen that these speeds are possible because, even for the shortest possible signal it is necessary for the shaft 84 to make two revolutions between the spacing interval preceding the signal and the actual selection of the corresponding slide 109, the first revolution resulting in one of the permutation combs 56 being shifted and the second revolution resulting in the space comb 74 being shifted. Thus, the shaft 117 may be run at half the speed of the shaft 84 without any danger of a selected character not being printed. However, it may happen in this phase of the operation of the mechanism that a selected slide 109 may be moved forward when the corresponding type-actuating lever 111 is at or near its uppermost position, but it may also happen that the slide 109 is moved forward when the corresponding type-actuating lever 111 is at or near the bottom of its stroke. The relative positions of these two parts are determined by the number of impulses in the corresponding signal. It is when a slide 109 is moved forward at a time when the corresponding type-actuating lever 111 is near the top of its stroke that the associated blade spring 108 yields so that the slide 109 is not moved to its operative position until the nose 110 of the associated lever 111 has been lowered sufficiently for the movement to occur.

The paths which the slides 109 traverse when they are moved longitudinally are controlled by the position of a slot 123a formed in a frame 123 pivoted about the axis of the spindle 114 and loaded by a spring 126. The spring 126 tends to swing the frame about the axis of the spindle 114 in a direction such that the slot 123a is raised. However, the position of the slot 123a is controlled by a transverse bar 127 formed with inclined cam edges 127a and 127b that bear respectively on the arms of the frame 123. The position of the slot 123a may thus be adjusted at will by moving the bar 127 longitudinally. Each slide 109 is formed at its end remote from the frame 123 with a tongue 109b which projects between two fixed bars 128. This arrangement enables the slides 109 to be moved in vertical planes, when the frame 123 is raised or lowered by moving the bar 127, as the tongues 109b turn on the lower bar 128 which serves as a fulcrum. The adjustment of the frame 123 determines the exact point in the movement of the type actuating levers 111 at which these levers strike their respective slides 109. This adjustment is necessary because, if the apparatus is working at high speed, the printing will be too violent and too deep impressions will be made on the paper strip unless the frame 123 is raised so that the type actuating levers 111 strike their respective slides later in the upward strokes of the type actuating levers 111 than is the case when the apparatus is working at a slower rate. The forward movement of the slides 109 to their operative positions is limited by stops 109a which engage the frame 123.

Figure 10:
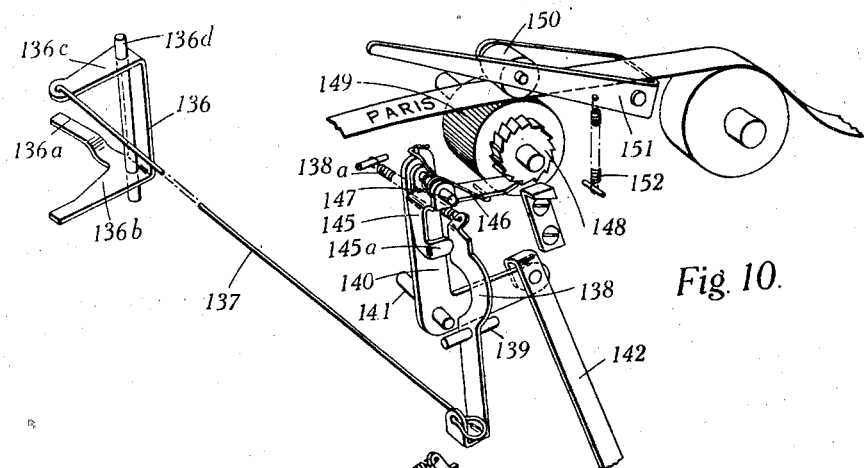
Figure 10 is a perspective view of paper feed mechanism incorporated in the apparatus.
Figure 9:
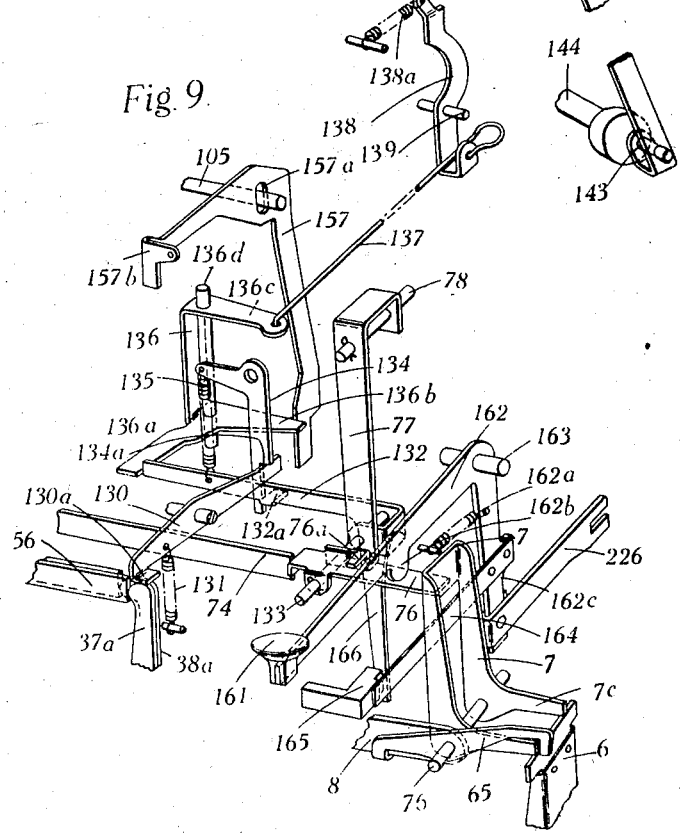
Figure 9 is a perspective view of letter spacing mechanism incorporated in the apparatus.

After a character has been printed, the paper strip has to be fed forward so that a blank part of the strip is brought into position to receive the next character to be printed. Accordingly, mechanism, shown in Figures 9 and 10, is provided for feeding the strip forward automatically. Actually this mechanism is arranged to be operated as a result of the receipt of an incoming signal in such a manner that the strip is fed forward just before this character is printed. The amount by which the strip is fed forward is such that the distance between the character and the character previously printed is the space required between two characters in a word.

When any signal, representing a character, is received, the result, as will be appreciated from the foregoing description, is that the L-shaped levers 37a and 38a are raised while one of these is swung about its axis so as to move the associated permutation comb 56 longitudinally. This happens whether the signal consists of one impulse or more than one impulse. When the L-shaped levers 37a and 38a are raised, the tops of the L-shaped levers push on a bent-over lug 130a at one end of a lever 130 (Figure 9) and swing this lever about a horizontal axis at its centre so that its end remote from the lug 130a is lowered sufficiently to press a lever 132 downwards to the position shown in Figure 9 against the action of a spring 135 and to enable this spring to swing a bell crank lever 134 to a position in which a shoulder 134a formed thereon locks the lever 130 in the position shown in Figure 9. The lever 132 is pivoted at one end about a spindle 133 carried by the interposed member 76, the lever 132 being turned about this spindle when it is pressed downwards. When at the end of a signal the actuator 7 moves the interposed member 76 longitudinally so as to operate the space comb 74, as described above, the lever 132 is also moved longitudinally. This results in a member 136 being turned about the axis of a vertical spindle 136d due to the lever 132 pushing on an arm 136a of the member 136, this arm 136a lying in the path of the end of the lever 132 when the latter is depressed by the lever 130 but not when the lever 132 is in its raised position. The movement of the member 136 causes a rod 137, connected to an arm 136c of the member 136, to be pulled longitudinally so that a stop member 138 is turned against the action of a spring 138a, about the axis of a spindle 139 to a position in which its upper end lies outside the path of a lug 145a (Figure 10) on a pawl 145 mounted on a bell crank lever 140. The latter is rocked to and fro continuously during the operation of the apparatus by means of a connecting rod 142 and a crank pin 143 fixed to a shaft 144. Usually, when the bell crank lever 140 swings in a clockwise direction as seen in Figure 10, the lug 145a engages the upper end of the stop member 138 so that the pawl 140 is swung against the action of a wire spring 146, about a spindle 147 which carries the pawl, the spindle 147 being mounted on the bell crank lever 140. The result of this is that the pawl 140 does not engage a ratchet wheel 148. When, however, the stop member 138 is outside the path of the lug 146a, the pawl 145 is not turned about the spindle 147 when the bell crank lever 140 moves in a clockwise direction. Thus, the pawl 145 engages the ratchet wheel 148. The latter is fixed to a paper-feed roller 149, the curved surface of which is serrated and bears against the paper strip. A smooth jockey roller 150 carried by a frame 151 is caused by a spring 152 to press the strip firmly against the roller 149. Hence, each time the ratchet wheel 148 is turned, the strip is fed forward.

The above described feeding of the strip is, as previously indicated, only sufficient to provide the necessary space between the two characters in a word and immediately the strip has been fed forward as a result of one operative stroke of the pawl 145, the stop member 138 is returned to the position in which it prevents further feeding of the strip. This return of the stop member 138 is brought about by a projection 132a on the lever 132 (Figure 9) which, after the lever 132 has been moved so as to turn the member 136 a predetermined amount, engages the bell crank lever 134 and swings it so as to disengage the shoulder 134a from the lever 130. Thus, the spring 131 is free to return the lever 130 to its initial position. The L-shaped levers 37a and 38a do not prevent the lever 130 from undergoing this return movement because they are lowered just after the lever 130 is latched by the bell crank lever 134 and, incidentally, before the space comb 74 and lever 132 are actuated. When the lever 130 is in its initial or inoperative position, the spring 135 holds the edge of the thick part of the bell crank lever 134 against one side of the lever 130 and it also holds the lever 132 in such a position that it cannot act longitudinally, if moved, on the member 136.

Between words it is, of course, necessary to provide longer spaces on the strip than between letters. The illustrated apparatus is constructed so that word spaces may be introduced in either one of two ways. The first way is dependent upon the provision of additional spacing intervals between character permutations on the perforated tape. In this case, therefore, every unperforated centre-hole space, or spacing interval, results in the strip being fed forward. The second way is dependent upon the reception of a specific signal. To enable word spaces to be inserted in these two ways, two additional exploring blades 153 and 154 (Figure 11) are mounted on the spindle 79. These exploring blades 153 and 154 are such that either one may be rendered capable of operation but not both simultaneously. Thus, a manually operable lever 250, arranged to assume two positions corresponding to the two ways in which word spaces may be introduced, is mounted so that if it is moved to one position its upper end lies under the exploring blade 153, with the result that this blade can in no circumstances enter notches in the combs 56, 251 and 74, while the blade 154 is free to enter its associated notches if these are brought into register. On the other hand, if the lever 250 is moved to its other position its upper end lies under the exploring blade 154 so that this blade can in no circumstances enter notches in the combs 56, 251 and 74, while the blade 153 is capable of entering its associated notches if these are in register. The exploring blade 153 is associated with notches in the permutation combs 56 and the additional comb 251 that are in register when these combs are in their normal positions, that is to say the positions in which they lie when they are not actuated by the L-shaped levers 37a ... 37f, 38a ... 38f and 38x. However, as in the case of the other exploring blades, the exploring blade 153 can only enter its associated slots when the space comb 74 is acted upon by the cross bar 7a of the actuator 7, acting through the intermediate member 76. The exploring blade 153 therefore enters its corresponding slots in the combs, provided the lever 250 is appropriately set, upon every spacing interval other than a spacing interval immediately following a signal, because during every such spacing interval no permutation comb 56 or comb 251 is moved and the actuator 7 traverses a path such that the space comb 74 is actuated. Thus, supposing the last character in a word is to be followed by a word space and the lever 250 is in the position in which it leaves the blade 153 free but holds up the blade 154, three spacing intervals are provided between the last impulse of the permutation representing the character and the first impulse of the permutation representing the first character of the next word. The first of these spacing intervals is the one that follows every permutation and the corresponding movement of the space comb 74 enables the selected exploring blade 72 to enter its corresponding notches in the combs. When this happens the exploring blade 153 cannot enter notches in the combs because one or more of the permutation combs has been moved due to the setting up of the permutation representing the last character in the word so that the notches corresponding to the blade 153 are not all in register. However, the permutation comb or combs that have been moved are then immediately unlatched by their latch members 73 so that during the next two spacing intervals all the permutation combs are in their initial positions. Thus, during the next two spacing intervals the corresponding two movements of the space comb 74 permit the exploring blade 153 to enter its notches. This actuation of the exploring blade 153 causes mechanism described below to cause the strip feed ratchet wheel 148 to be stepped round twice. Actually the paper is stepped forward three times between the two words because, in addition to the two movements due to the exploring blade 153 there is the usual letter space movement that takes place automatically (as already described) due to the actuation of the lever 132 and its associated mechanism (shown in Figure 9) immediately before the printing of the first character in the next word.

Now, assuming that the exploring blade 154 is freed by the lever 250 while this lever puts the exploring blade 153 out of action, then the condition of the apparatus is such that the word space has to be inserted by the transmission of a special signal consisting of a permutation that results in the permutation combs 56 being set so as to bring the notches corresponding to the exploring blade 154 into register. Thus, when the permutation corresponding to the last character in a word has been transmitted, the permutation which results in the actuation of the exploring blade 154 is transmitted. This, as mentioned above, results in the permutation being set up on the permutation combs 56, and the space comb 74 is thereupon moved because the effect of the signal on the apparatus so far as the combs and their actuating mechanism are concerned, is the same as that of any ordinary character signal. Thus, the paper strip is fed forward by an amount equal to the ordinary letter space through the medium of the lever 132 and its associated mechanism shown in Figure 9. The paper strip is then immediately stepped forward once more by an amount equal to an ordinary letter space, as a result of the entry of the exploring blade 154 into its associated notches in the combs. The mechanism through the medium of which the exploring blade 154 causes the paper strip to be fed forward is that described below, which is associated for the same purpose with the exploring blade 153. If a character signal representing the first character in a new word immediately follows the word space signal, the paper strip is stepped forward once more before this character is printed on account of the movement of the lever 132 and its associated mechanism that takes place when the space comb 74 is shifted to permit the exploring blade 72 corresponding to the character to enter slots in the combs. Thus, the paper strip is stepped forward three times if a word space signal is introduced once between two words. In the above description it has been assumed that the word spaces are introduced between two words but, of course, the spaces may be introduced between any two printed characters whether these are letters, numerals, punctuation marks or other signs. Further, the space between two characters may be made longer than the space provided when the strip is fed forward three consecutive times. Thus, when the exploring blade 153 is capable of operation, any desired number of spacing intervals may be introduced between the last perforation in the perforations representing one character and the first perforation in the perforations representing the next character. Also, when the exploring blade 154 is in operation, any number of consecutive spacing signals may be sent.

When either one of the exploring blades 153 and 154 is in operation and when its associated notches are not in register, the engagement of the exploring blade with the upper surface of the combs causes the exploring blade to follow a path such that a lug 153a or 154a does not engage a lug 155a on a frame 155 pivoted about the axis of a horizontal spindle 105. When, however, the blade enters its associated notches, its lug 153a or 154a engages the lug 155a and causes the frame 155 to swing about the axis of the spindle 105 against the action of a spring 158 connected between an arm 156a on a pivoted member 156 and an arm 155b of the frame 155. The movement of the frame 155 and the consequent straining of the spring 158 results in a lug 156c on the member 156 moving out of a notch 155c in the arm 155b of the frame 155. As soon as the lug 156c leaves the notch 155c, the spring 158 urges the lug 156c to one side of the notch 155c so that as soon as the exploring blade that has moved the frame 155 moves out of engagement with the lug 155a, the frame 155 does not return to its initial position but is latched in the position to which it has been moved on account of the engagement between the lug 156c and the edge of the arm 155b of the frame 155. When the frame 155 is turned to the latter position, a member 157 is no longer prevented by it from being lowered to a position such that a wide part 157d of the member 157 is interposed between the bent-over upper end 160a of a dog 160 and an arm 136b of the member 136. The dog 160 is fixed to link 11 which is continuously reciprocated by the eccentric 10 and which causes the frame 8, carrying the actuator 7, to be rocked up and down. Before the member 157 is lowered, the dog 160 is reciprocated beneath the level of a shoulder 157c on the member 157 and does not move this member. When, however, the frame 155 is lowered, the bent-over part 160a is immediately beneath the shoulder 157c but is soon afterwards moved to beyond the shoulder 157c so that the member 157 can follow the frame 155 downwards. The dog 160 then engages the edge of the wide part 157d of the member 157 and pushes on it so that the member 157 is swung about the axis of the spindle 105 and pushes on an arm 136b of the member 136 with the result that this member 136 is turned. This movement of the member 136 causes the rod 137 to be pulled and the stop member 138 (Figure 10) to be removed from the path of the lug 145a on the pawl 145 so that the ratchet wheel 148 is stepped round and the paper strip is stepped forward. Further, this movement of the member 136 causes its arm 136c to act on the end 156b of the member 156 so that this member is turned to bring the lug 156c into register with the slot 155c. The frame 155 is thus unlatched and the spring 158 returns it to its initial position. The upward movement of the arm 155b which engages a lug 157b on the member 157, causes the member 157 to be raised so that the shoulder 157c is raised above the dog 160. The spring 138a (Figure 10)

is then free to return the stop member 138, the rod 137 and the member 136 to their initial positions.

The spindle 105 passes through a slot 157a formed in the member 157 (see Figure 9) while the latter is connected by a spring 159 (see Figure 11) to the arm 155b of the frame 155. This arrangement permits the member 157 to fall and rise in the manner described above.

It may be mentioned that the two-position lever 250 may be arranged to be moved automatically instead of manually.

When there is a large interval between two sets of signals, that is to say, when signal traffic is interrupted for a considerable time, and when the exploring blade 153 is operative, it is often desirable to prevent the paper strip being fed forward continuously between the time when traffic ceases and the time when traffic starts again. Accordingly, the paper strip feed may be stopped by depressing a button 161 (Figure 9) on a "slip saver" lever 162 pivoted about the axis of a spindle 163, the "slip saver" lever 162 being moved against the action of a spring 162a. The depression of the "slip saver" lever 162 causes a lug 162b to depress one end of the interposed member 76 so that the latter is tilted, against the action of a spring (not shown), about the axis of the spindle 133. When the "slip saver" lever 162 is depressed, it is latched in the depressed position because the end of a leaf spring 164, fixed to a downwardly extending part 162c of the "slip saver" lever 162, engages behind a shoulder formed on a fixed member 165. Thus the interposed member 76 is held in its tilted position until the "slip saver" lever 162 is unlatched. When the interposed member 76 is in its tilted position, the transverse bar 7a of the actuator 7 cannot act on it so as to shift the space comb 74. Accordingly the exploring blade 153 is prevented from entering notches in the combs as long as the interposed member is tilted. Consequently, the paper strip is not moved forward on account of the actuation of the exploring blade 153.

If traffic begins when the interposed member 76 is tilted, the result is that the interposed member 76 is returned automatically and immediately to its operative position. The reason for this is that the first impulse in the first signal causes, in the manner described above, one or other of the L-shaped levers 37a or 38a to turn the lever 130 so as to swing the lever 132 downwards. Thus, a downwardly extending arm 166 formed on the lever 132 pushes laterally on the blade spring 164 and moves it out of engagement with the shoulder on the fixed member 165. The spring 162a is, therefore, permitted to raise the "slip saver" lever 162 so as to allow the interposed member 76 to be returned to its operative position. The return movement of the interposed member 76 is limited by a stop 76a. The interposed member 76 is returned to its operative position in time to enable the actuator 7 to actuate the space comb 74 during the spacing interval immediately following the first signal, so that the character corresponding to the signal is printed. The lever 132 is actuated so that the paper strip is stepped forward once prior to the printing of this signal.

Frequently it is desirable for mechanism to be provided which enables the operator of a transmitter to actuate some call device in a receiver or to perform an analogous function. In the illustrated apparatus such mechanism is provided. The mechanism includes an exploring blade 170 (Figure 12) which is actuated in the same way as the other exploring blades and is associated with a three-armed lever 104 which is the same as the three-armed levers 104 associated with the exploring blades 72. When it is desired to operate the call device a special signal is transmitted which results in the permutation combs 76 being set so that the exploring blade 170 can enter registering notches in these, with the result that a lug 170a depresses the arm 104a of the three-armed lever 104 associated with the exploring blade 170.

Figure 12:
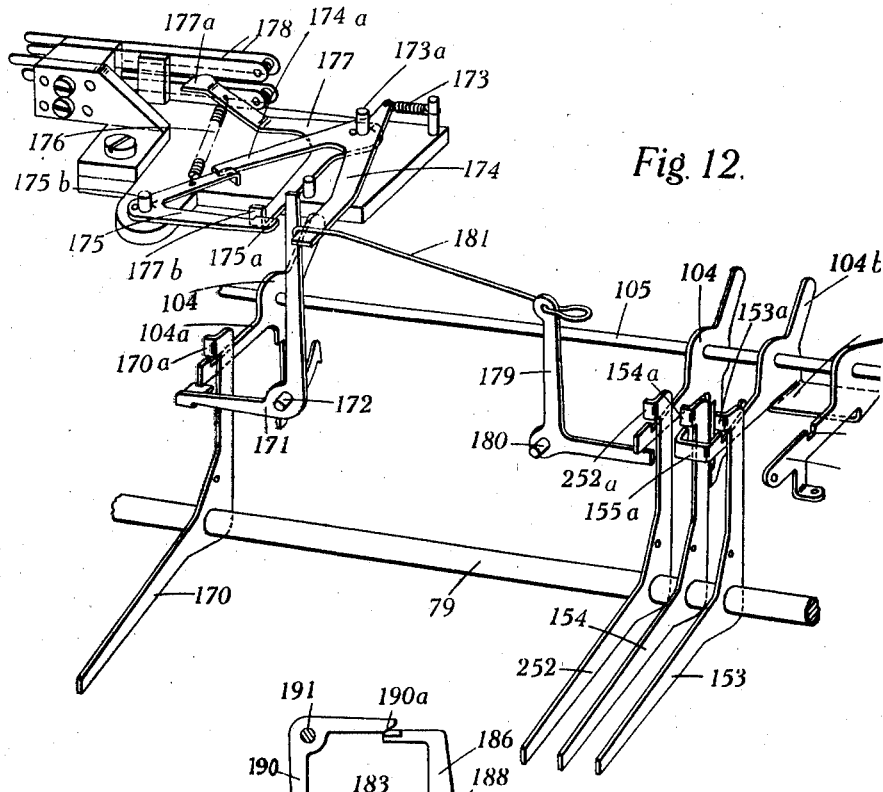
Figure 12 is a perspective view of a call device, together with some associated mechanism, incorporated in the apparatus.

The arm 104a of the three-armed lever 104 bears on a bell-crank lever 171 and swings it about the axis of a horizontal spindle 172 in such a direction that it bears on a bell-crank lever 177 and swings the latter about the axis of a spindle 173a. This movement of the bell-crank lever 177 results in its end 177a pressing together two pairs of contact springs 178 and thereby closing contacts so as to start a perforator or set some other instrument into operation. The two springs 178 lying in the vertical plane adjacent the end 177a of the bell-crank lever 177 are connected together by an insulating block 178a. The bell-crank lever 177 is connected to a bell-crank lever 175 by a spring 176 which, when the contacts are closed, is stretched and causes the shoulder of a lug 175a of the bell-crank lever 175 to engage the edge of a vertical lug 177b on the bell-crank lever 177. Thus, the lever 177 is latched in the position to which it is moved and the contacts are maintained closed after the exploring blade 170 has been raised from its operative engagement with the combs (so as to permit the spring 173 to return the bell crank lever toward the position shown in Figure 12 and thereafter for a indefinite period). The actuation of the instrument controlled by the contacts on the contact springs 178 may be stopped at will by the operator of the transmitter by sending a further special signal. This signal results in the permutation combs 56 being set so that a further exploring blade 252 can enter registering notches in them. When this happens a lug 252a bears on the arm 104a of an associated three-armed lever 104 which in turn bears on a bell crank lever 179 and swings it in a clockwise direction, as seen in Figure 12, about the axis of a spindle 180. Thus, a rod 181, connected between the bell crank lever 179 and a bell crank lever 174, is pulled so as to swing the bell crank lever 174 against the action of a tension spring 173. The arm 174a of the bell crank lever 174 then swings the bell crank lever 175, against the action of the spring 176, about a vertical axis 175b in a clockwise direction, as seen in Figure 12, so that the lug 175a is removed from engagement with the edge of the lug 177b and the end 177a of the bell crank lever 177 is withdrawn from engagement with the contact springs 178 which separate due to their inherent springiness. The controlled circuit is, therefore, opened and the parts are returned to their initial position, shown in Figure 12, with the edge of the lug 175a bearing against the face of the lug 177a.

The three-armed levers 104 associated with the exploring blades 170 and 252 are not associated directly with any printing mechanism but are provided for association with scrutinizer mechanism described below.

Figure 13:
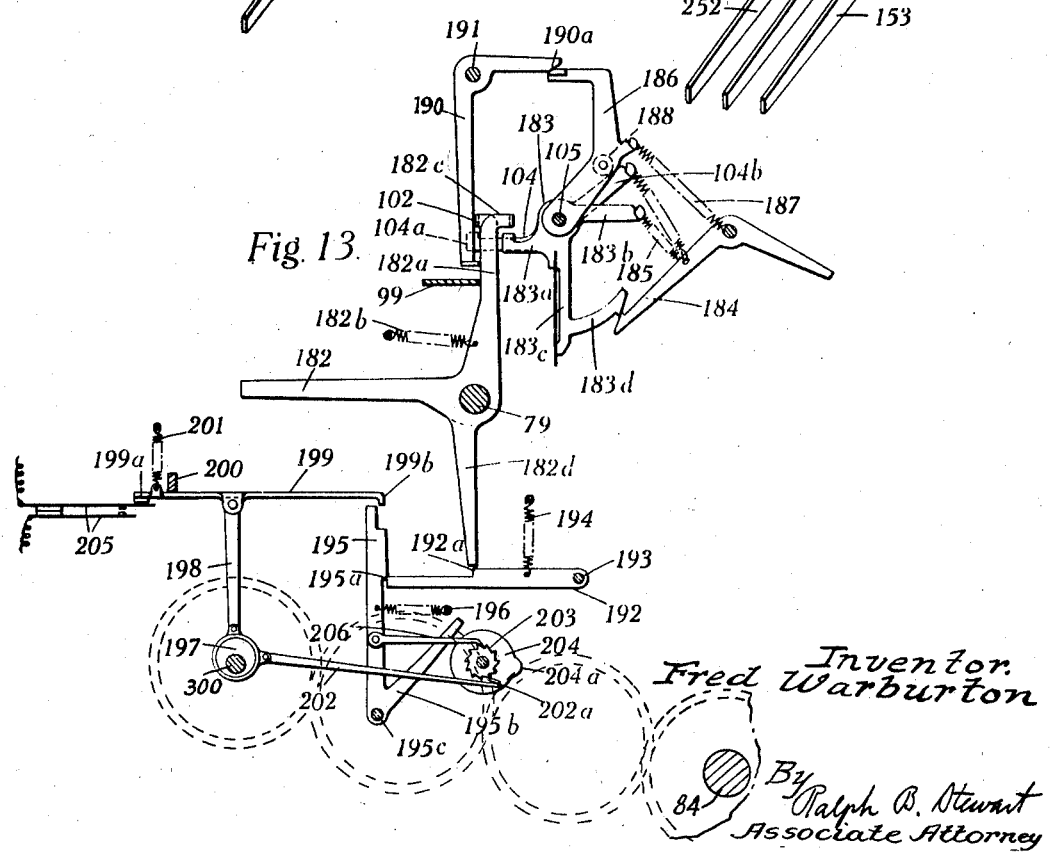
Figure 13 is a diagrammatic elevation of certain parts shown in Figure 7 and of associated parts not shown in that figure.

The apparatus is provided with mechanism arranged to print a distinctive mark on the paper strip and to send a distinctive signal to the operator of the transmitter in the event of a fault resulting in a mis-selection leading to none of the exploring blades 72, 153, 154, 170, 252 being able to enter registering notches in the permutation combs or to two signals being run together without an intervening spacing interval. Thus, in addition to the other exploring blades, the spindle 79 carries a scrutinizer blade 182 (Figure 13). This is associated with a three-armed lever 183 that is somewhat different from the three-armed levers 104 associated with the other exploring blades. The scrutinizer blade 182 is associated with wide slots in all the combs except the space comb 74 so that it would enter these slots at each centre-hole interval, upon being brought to bear on the combs, were it not for the space comb 74. Thus, as soon as the space comb 74 is actuated, slots are arranged for the reception of the scrutinizer blade 182, whatever the setting of the permutation combs 56 and additional comb 251. When, therefore, the permutation combs 56 and space comb 74 have been set according to an incoming signal, the movement of the spindle 79 and the setting of the combs is such that the blade 182 tends to be moved downwards and upwards with its upwardly extending part 182a held continuously against the rest 99 by the spring 182b. However, if, during the downward movement one of the other exploring blades 72, 153, 154, 170, 252 enters its corresponding notches in the combs, the associated three-armed lever 104 or frame 155 is rocked about the axis of the spindle 105 as described above. During this movement its arm 104b (the frame 155, like the three-armed levers 104, is provided with an arm 104b) bears on a cross-member 188, extending above all the three-armed levers 104 and the frame 155 and fixed to an arm 186 pivoted about the axis of the spindle 105, and thereby causes the arm 186 to be swung against the action of a spring 187, in an anti-clockwise direction as seen in Figure 13. The upper end of the arm 186 then acts on a cam surface 190a on one arm of a bell crank lever 190 and causes this to be swung about the axis of a spindle 191. The lower end of the bell crank lever 190 is thus caused to thrust the upwardly extending part 182a of the scrutinizer blade 182 away from the rest 99. A lateral lug 182c at the upper end of the part 182a is accordingly caused to traverse a path such that it does not engage a lug at the end of an arm 183a on the three-armed lever 183 but passes down to the right of this lug, as seen in Figure 13. On the other hand, if the bell crank lever 190 is not actuated because of a mis-selection resulting in none of the three-armed levers 104 nor the frame 55 being actuated, the arm 182a is held against the bar 99 during the whole time that the scrutinizer blade 182 is within its notches and the lug 182c traverses a path such that it engages the lug on the arm 183a of the three-armed lever 183 and turns this so that it is latched by a hook member 184 exactly similar to the hook members 106. The three-armed lever 183 is associated with type-actuating mechanism in exactly the same way as the three-armed levers 104 so that a warning mark is printed on the paper strip when the scrutinizer blade 182 is rendered operative.

The additional comb 251 is for co-operation with the scrutinizer blade 182. As the apparatus is designed to operate in conjunction with code in which no signal is composed of more than six impulses, the scrutinizer comb 251 is never shifted to the left, as seen in Figure 3, during normal operation of the apparatus. This, of course, is because a spacing interval always intervenes before the actuator 7 has an opportunity of actuating the interposed member 19g (Figure 3). When, however, a fault results in the omission of one or more of the spacing intervals that should exist between consecutive signals so that the two or more signals are run together, the result is usually that seven or more immediately adjacent impulses are received. Consequently, all seven interposed members 19a . . . 19g are unlatched in succession and acted upon by the actuator 7. When the actuator 7 acts on the interposed member 19g and causes the corresponding rocking plate 22g to swing about the axis of the spindle 23 so as to raise the L-shaped lever 38x, the latter is swung about its axis due to its engagement either with the cross piece 47 on the armature frame 41 or with the cross piece 48 on the armature 42. As previously explained, the L-shaped lever 38x is turned, upon being raised, whether the impulse which causes it to be raised is a dash impulse or a dot impulse because in the one case the cross piece 48 engages the part 54 of the L-shaped lever 38x, while in the other case the cross piece 47 engages the part of the L-shaped lever on the side of its notch remote from the part 54. When the L-shaped lever 38x is turned, it pushes the scrutinizer comb 251 to the left and the comb 251 is latched in the operative position to which it is moved by its associated latching member 73. The comb 251 is formed with notches which, when the comb is in its zero or initial position, are in positions such as to enable any of the exploring blades to enter registering notches in the permutation combs 56 and space comb 74. When, however, the scrutinizer comb 251 is in its operative position the high parts of the comb between its notches register with all the exploring blades except the scrutinizer blade. The result of this is that when the space comb 74 is shifted none of the exploring blades 72, 153, 154, 170 and 252 can enter registering notches. They are all, therefore, prevented from acting on their associated three-armed levers to swing the arm 186, while the part 182a of the scrutinizer blade 182 follows the path in which it rests continuously against the rest 99 and causes the warning mark to be printed.

A further exploring blade (not shown) is provided which is arranged to enter alined notches whenever the combs 56 and 251 are in their initial or zero positions and only the space comb has been moved. This further exploring blade is not associated with any printing or other mechanism but is only associated with an extra three-armed lever 104. This further exploring blade ensures the scrutinizer mechanism functioning properly when the word space exploring blade 154 is in operation. Thus, when no signal is being sent, i. e., when no character, word space or other signal is being received and the apparatus is in operation so that the exploring blades are continuously being brought into engagement with the combs, the further exploring blade enters alined notches in the combs and swings its associated three-armed lever 104 so as to act on the bar 188 and turn the arm 186, thereby preventing the scrutinizer blade 182 from causing successive warning marks from being printed. It will be appreciated that this is necessary because when no signals are received and the exploring blade 153 is out of action, none of the three-armed levers 104 and frame 155 associated with the exploring blades 72, 153, 154, 170 and 252 are actuated. The said further exploring blade is, in these conditions, always able to enter registering notches because the space comb 74 is shifted during each spacing movement of the actuator 7.

When the upwardly extending part 182a of the scrutinizer blade 182 is moved away from the rest 99, the tip of a downward extension 182d on the scrutinizer blade follows a path such that it does not engage a lever 192 pivoted about the axis of a horizontal spindle 193. When, however, a mis-selection occurs the movement of the downward extension 182d is such that its tip bears against the thickened part to the right (as seen in Figure 12) of a shoulder 192a on the lever 192 and turns the lever 192 against the action of a spring 194. The end of the lever 192 remote from the spindle 193 is, accordingly, moved downwards to a point beneath a shoulder 195a on a bell crank lever 195 so that a spring 196 is permitted to turn the bell crank lever 195 about the axis of a spindle 195c in a clockwise direction. Before the bell crank lever 195 is moved in this manner, a lever 199 is rocked continuously about a fulcrum provided by a fixed bar 200, through the medium of an eccentric 197 acting through an eccentric rod 198. The lever 199 is held in contact with the bar 200 by a spring 201. As soon, however, as the bell crank lever 195 is released by the lever 192, its upper end is brought under the end 199b of the lever 199 and replaces the bar 200 as the fulcrum of the lever 199. Thus, the amplitude of oscillation of the end 199a of the lever 199 is increased considerably as it is caused to rock about the upper end of the bell crank lever 195 instead of about the bar 200. In fact, the lever 199 is drawn down from the bar 200. As a result, the end 199a moves sufficiently to press together contact springs 205 during each oscillation. A series of impulses, serving as a warning, are accordingly sent to the transmitter, the contact springs 205 being connected to the transmitter. These impulses are continued until a ratchet wheel 203, reciprocated through the medium of the eccentric 197 and eccentric rod 202 carrying a pawl 202a and cam 204, has stepped round the cam 204 sufficiently to bring a lobe 204a on this cam into engagement with the arm 195b of the bell crank lever 195 and thereby to swing the latter against the action of the spring 196 to the position in which the spring 194 can lift the lever 192. The bell crank lever 195 is consequently re-latched in its inoperative position.

The length of the arm 183a of the three-armed lever 183 is only about half the length of the arms 104a of the three-armed levers 104. Further, the lug 182c is arranged so that it engages the lug on the arm 183a somewhat later in the downward travel of the spindle 79 than the lugs 102 on the exploring blades 72 and 170, engage the arms 104a. Thus, supporting a selection is made resulting in the turning of one of the three-armed levers 104 due to the entry of an exploring blade 72, 170 into its associated notches and the engagement by its lug 102, 170a with the appropriate arm 104a, then when the lug 102 has engaged the arm 104a, the lug 182c has not yet engaged the arm 183a. Accordingly, there is time for the selected three-armed lever 104 to cause the bell crank lever 190 to swing the lug 182c beyond the lug on the arm 183a before engagement between these two lugs takes place. If, however, there is a mis-selection and the path of the lug 182c is not altered by the bell crank lever 190 then, even althought the lug 182c engages the lug on the lever 183a late in its travel, it swings the lever 183 through the same angle as the levers 104 are swung, when actuated, because the lever 183a is about half the length of the levers 104a and the movement of the lug 182c necessary to turn the three-armed lever 183 through a certain angle is only about half the movement of one of the lugs 102, 170a necessary to turn the associated three-armed lever 104 about the same angle.

In certain telegraph systems, when no messages are being sent, synchronising signals are sent from the transmitter to the receiver in order to keep the receiver in synchronism with the transmitter. These correcting signals are constituted by alternate dot and dash impulses (i. e., positive and negative impulses) with a centre-hole space between each impulse. The impulses are transmitted automatically and intermittently during pauses in transmission of traffic and are known as idle signals. In certain circumstances it is necessary to provide mechanism which prevents these idle signals from actuating the selector and printing mechanism in a receiver. Accordingly in the illustrated construction, the "slip saver" lever 162 (Figures 9 and 14) upon actuation, is arranged to disable the circuits of the magnets 1, 2 and 3. The mechanism associated with the "slip saver" lever 162 by means of which the magnets 1, 2 and 3 are rendered inoperative, is shown in Figure 14. Referring to this figure, it will be seen that the shaft 84 (Figures 11 and 14) is geared to a shaft 220 through the medium of pinions 221 and 222. These pinions provide a 2:1 step down ratio so that the shaft 220 is rotated at half the speed of the shaft 84. The shaft 220 carries two cams 223 and 224. Each of these cams is formed with a raised lobe extending over substantially half its circumference and the two cams are fixed 180 degrees out of phase with each other as shown in Figure 14. A bell crank lever 225 is arranged so that it may be brought at will into position for co-operation with one or other of the cams. Now if the finger piece 161 on the "slip saver" lever 162 is depressed so as to prevent the space comb 74 from being operated, a forked thrust member 226, pivoted to the lower end of the downwardly extending part of the "slip saver" lever 162 is moved longitudinally so as to swing a frame 227 about a horizontal axis passing through apertures 227a, the frame being moved against the action of a spring 228. The frame 227 carries a spindle 229 upon which the bell crank lever 225 is pivoted and when the frame is moved, as described above, one arm 225a of the bell crank lever 225 is brought into the path of the lobe of one or other of the cams 223 or 224. The bell crank lever 225 is then rocked about the axis of the spindle 229 by the lobes of the cam 223 or 224 so that a bar 230 (made of insulating material) carried by the bell crank lever 225 alternately raises a resiliently mounted contact plate 231 and permits this plate to descend. The contact plate 231 carries two contacts which are associated respectively with contacts carried by two contact springs 232 and 233, and the two pairs of contacts are closed each time the contact plate 231 is raised. The contact plate 231 and the two contact arms 232 and 233 are connected in a circuit (shown in Figure 2) arranged so that each time the contacts are closed the magnets 1, 2 and 3 are short-circuited. Now assuming that the cam 223 is acting upon the bell crank lever 225 and that the lobe of this cam acts on the bell crank lever 225, when one impulse of an idle signal is received, it will be seen that this impulse will have no effect on the selector and printing mechanism because the magnets are not energised. During the ensuing centre-hole interval no impulse is received and the contacts carried by the plate 231 and the contact arms 232 and 233 are open. The shaft 84 makes a complete revolution in this interval but the shaft 220 as indicated above, only makes half a revolution. Thus, when the next impulse in the idle signal arrives, the lobe of the cam 223 has reached a position in which it acts on the bell crank lever 225 and swings this lever so as to bring about the short-circuiting of the magnets 1, 2 and 3.

It may happen that when the "slip saver" lever 162 is depressed and idle signals are being transmitted, that the cam 223, assuming this to be rocking the bell crank lever 225, causes the magnets 1 and 2 to be short-circuited during the centre-hole intervals between the impulses of the idle signal. This state of affairs would arise if the cam 223 was not in the correct phase relationship with the incoming signal and the effect would of course be that the magnets 1, 2 and 3 would be energized by the impulses of the incoming signal. It is in order to provide for such an occurrence as this that two cams are provided. Thus, if the operator finds that the cam 223 is out of phase, he depresses one end of a springy lever 234 and swings it about the axis of its pivot 235 to a position such that it extends through the side of a gate 236 remote from the side on which it is shown in Figure 14. This movement of the lever 234 causes its end, on the side of the pivot 235 remote from the gate, to be swung so as to allow a spring 237 to pull the bell crank lever 225 together with the spindle 229 laterally to a position such that the arm 225a of the bell crank lever 225 lies opposite the cam 224. To permit this lateral movement to take place, the spindle 229 is free to slide axially through the frame 227. It will be seen that, as the lobe of the cam 224 is 180 degrees out of phase with the lobe of the cam 223, the lever 225 will be rocked at the correct intervals to short-circuit the magnets each time an impulse of the idle signal arrives. Naturally, if, when the cam 224 is acting on the bell crank lever 225 the contacts carried by the plate 223 and the contact arms 231 and 232 are closed in the intervals between the impulses of an idle signal, then the lever 234 is returned to the position shown in Figure 14, so that the bell crank lever 225 is moved laterally against the action of the spring 237 back to the position shown in Figure 14. As soon as traffic commences there will be two impulses transmitted without any centre-hole interval between them. This departure from the idle signal condition, in which there is always a centre-hole interval between each two consecutive impulses, will immediately be detected by the apparatus on account of the fact that the impulse which is transmitted at a time corresponding to the space intervals in the idle signal is received at a time when the magnets 1, 2 and 3 are not short-circuited by the cam 223 or the cam 224. The actuation of the magnets results in the L-shaped levers 37a and 38a being raised so that the lever 130 (Figure 9) is swung, with the result that the "slip saver" lever 162 is returned, in the manner described above, to the position in which it permits the actuator 7 to operate the space comb 74. The return of the "slip saver" lever results in the frame 227 being turned by the spring 228 to a position in which the bell crank lever 225 cannot be operated upon by either of the cams 223 or 224.

Figure 15:
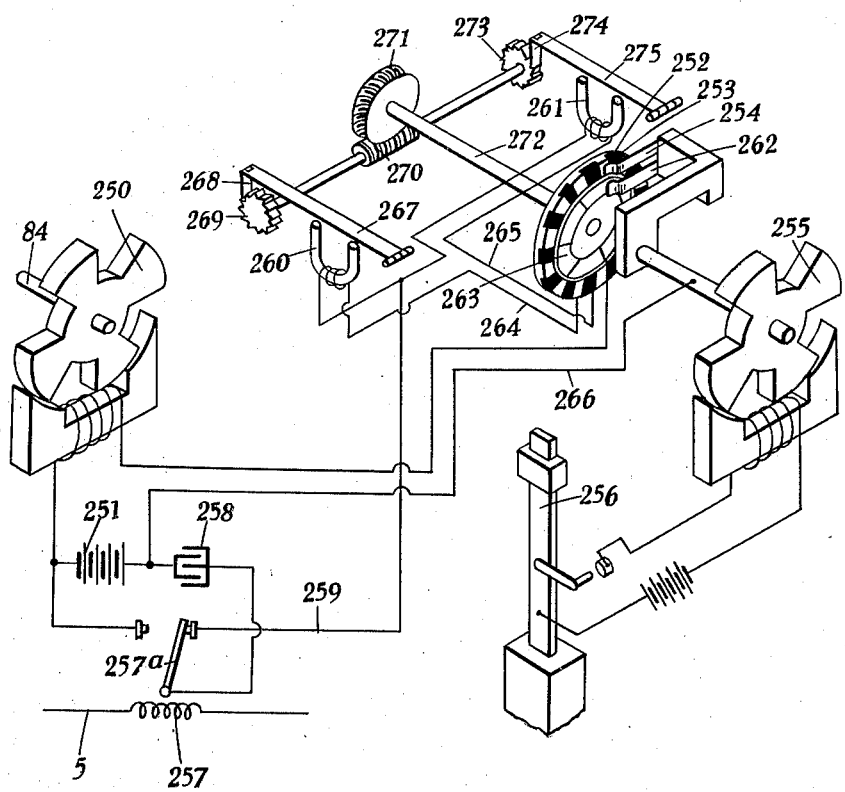
Figure 15 is a diagram showing the arrangement of driving mechanism for the apparatus.

The particular means employed for driving the shaft 84 at signal element speed constitute no part of the present invention and various known arrangements for driving this shaft will be apparent to those skilled in the art. One arrangement includes part of the apparatus described in British Patent Specification No. 234,179 and is shown diagrammatically in Figure 15. Referring to this figure, it will be seen that the shaft 84 is driven by a phonic wheel synchronous motor 250 which receives pulses of current, from a battery 251 or other source of direct current, through a ring of alternate insulating and conducting segments 252, carried by a disc 253, and a brush 254 that is carried round so as to sweep over the segments 252 by a second phonic wheel motor 255. The latter rotates under the control of a reed 256 at a constant speed that is as nearly as possible such that exactly four consecutive signal elements or spacing intervals arise per revolution of this wheel 255. In order to compensate for any lack of synchronism between the received signals and the rate of rotation of the wheel 255, apparatus is provided whereby the angular position of the disc 253 is automatically adjusted under the control of received signals so that the shaft 84 is always rotated at substantially exactly the correct speed.

This apparatus includes a relay 257 in the line 5, the tongue 257a of which, upon the passage of every impulse, momentarily closes a circuit including the battery 251 and a condenser 258 so that the latter is charged. As soon as the relay tongue 257a returns to its initial condition shown in Figure 15, the condenser discharges through a line 259 and one or both of two electromagnets 260 and 261. The question of which of the two electromagnets 260 and 261 the discharge current passes through, is determined by the relative position of a brush 262, mounted in parallel with the brush 254, and an inner ring of segments 263 on the disc 253. There are eight segments in the inner ring of segments 263 and alternate segments in this ring are connected respectively by two lines 264 and 265 and associated brushes and slip rings to the electromagnets 260 and 261. The two slip rings are mounted on the back of the disc 253 as also is a third slip ring connecting the alternate conducting segments, of which there are 16, in the outer ring 252. If the incoming signals are exactly in step with the motor 255, the condenser discharges at instants when the brush 262 engages a division between two segments in the ring 263, one of the segments being associated with the line 264 and the other segment being associated with the line 265, so that the discharge passes through both electromagnets 260 and 261, thence through both segments, the brush 262 and a line 266. If, however, the discharge from the condenser 258 occurs when the brush 262 is either in advance of or behind the division between the two segments, the discharge current will pass only through the magnet 260 or only through the magnet 261. If the magnet 260 is energized, its armature 267 is attracted so that a pawl 268 steps a ratchet wheel 269 round in an anti-clockwise direction, with the result that the disc 253 is turned through a small angle through the medium of a worm 270, a worm wheel 271 and a shaft 272. On the other hand, if the electromagnet 261 is energized, the disc 253 is turned through a small angle in the opposite direction, due to the stepping round in a clockwise direction of a ratchet wheel 273 by a pawl 274 on an armature 275. In the aforesaid case where both magnets are energized the armatures 267 and 275 tend to turn the ratchet wheels 269 and 273 respectively in opposite directions so that there is no movement of the disc 253. It will be seen, therefore, that when signals get slightly out of step, the disc 253 is turned in one direction or the other so as to vary the relative rate of rotation between the brush 254 and the segments 252, thereby altering momentarily the rate at which pulses of current are delivered to the phonic wheel motor 250. The shaft 84 is thus kept in step with the incoming signals.

The shaft 117 for the type mechanism is geared to the shaft 84 by toothed wheels 276 and 277 (Figure 7). The shaft 144 (Figure 10) is geared to the shaft 84 through the medium of bevel pinions 278 and 279 (Figure 1). The eccentric 197 in Figure 13 is carried by a shaft 300 geared to the shaft 84. The latter drives the shafts 144 and 300 at its own speed and the shaft 117 at half its speed.

It is to be understood that the invention is not limited to apparatus capable of handling cable Morse code. In fact, the invention may be applied to apparatus for handling practically any even or uneven length code. For example, the apparatus particularly described above could be arranged to handle five- or six-unit codes with very little modification. In the case of such equal length codes, the same number of the interposed members 19a ... 19g would be unlatched for each signal. In the case of the Wheatstone Morse code where the dashes are represented by impulses three times as long as the dot impulses, it is necessary to provide up to ten interposed members. The reason is that a dash occupies two centre-hole spaces and some characters may include up to five dashes. Thus, apparatus designed to handle Wheatstone Morse code and built according to the invention may have ten interposed members and these need only be associated respectively with ten associated combs. Hence, in this example of the invention, each interposed member is pivoted to a rocking plate carrying only one L-shaped lever which is for actuating the comb associated with the interposed member. With Wheatstone Morse code the sequence of operations is somewhat different from that in the case of cable Morse code and even length codes in which the elements are all the same length. Thus, in the apparatus as arranged for Wheatstone Morse code working, an initial signal impulse causes the actuator to descend and operate the first interposed member. The latter thereupon rocks its associated rocking lever, thus raising the associated L-shaped lever. A single selecting magnet is employed for co-operating with the L-shaped lever and is arranged to interpose a stop in the path of the L-shaped levers on the return or downward movement of the latter, which is the reverse arrangement to that described in connection with the illustrated example.

Thus, for example, if a Wheatstone Morse dot, which is of short duration in relation to a centre-hole period, is received, the armature of the selecting magnet will be in the unattracted position by the time the L-shaped lever has reached the top of its upward stroke and therefore is allowed to fall behind the toe of the L-shaped lever. Thus, the latter, during its return or downward stroke, is engaged by the extension of the armature of the selecting magnet and the L-shaped lever is rocked so that the corresponding comb is shifted.

If a Wheatstone Morse dash impulse, which is three times the length of a dot impulse, arrives, during the first downward stroke of the L-shaped lever, no comb is moved because the extension of the armature of the selecting magnet is still held in the attracted position and consequently out of the path of the toe of the L-shaped lever. The second interposed member already unlatched is actuated but, on the return or downward movement of the L-shaped lever during its second stroke, will be intercepted by the armature extension of the selecting magnet because the dash signal impulse by that time has ended. The L-shaped lever therefore moves the second comb to the left. The total result therefore is that with a Wheatstone Morse dot impulse, a comb is set on the first actuation of its respective actuating mechanism, while with a Wheatstone Morse dash impulse the first comb of that selection impulse is not operated but the second comb is shifted instead. At the end of a complete character, the space comb may be shifted to the right in the same manner as already described for the form of mechanism used with cable Morse code working and this shifting of the space comb at the end of a character completely opens the gate for the appropriate exploring blade of the printing or perforating mechanism.

In a further modification the apparatus is substantially the same as that illustrated, that is to say, the apparatus is arranged for handling cable Morse code or equal length codes, and embodies pairs of permutation combs controlled through the medium of pairs of L-shaped levers, but has a single magnet for co-operation with the L-shaped levers. This magnet is polarised and the armature has two positions in one of which it can act on one of the levers in each pair of L-shaped levers, and in the other of which it can act on the other lever in the pair of L-shaped levers.

As a further alternative, in apparatus arranged for handling cable Morse code or an even length code, it is possible to arrange for each interposed member to be associated with one comb only, so that there is one comb per impulse of each signal. In this case, each comb is moved for one kind of impulse and allowed to remain stationary for the other kind of impulse.

The selecting mechanism according to the invention may be arranged to operate on the start-stop principle and is then driven through a clutch mechanism. The latter may conveniently be driven at half the speed of the printing or exploring mechanism and this is a much easier working speed for the clutch mechanism. No such clutch mechanism is necessary when the selecting mechanism is operated by a constantly reciprocating member when the speed and phase of the driving motor are controlled by the incoming signal impulses. Even when driven by a motor kept to speed by a mechanical governor, it is convenient to operate the mechanism from a constantly reciprocating member without a clutch mechanism by providing a storage device such as the well-known condenser storage system or sliding pin storage system and so forth, by which the signals can be received independently of the position of the actuator of the selecting mechanism. In that case, if the signals should be out of phase they are stored in the storage device until the appropriate moment for them to operate the receiving magnets arrives.

In another slightly modified form of apparatus according to the invention, the bar 127 for controlling the position of the points in the paths of the type actuating levers 111 at which these levers strike the slides 109, is not arranged only for manual operation but is coupled to the speed regulator of the driving motor for the apparatus. This arrangement enables practical conditions to be dealt with more easily because in the absence of the bar 127 and its associated mechanism, variations in speed would cause variations in the intensity of the type, that is to say, an increase in speed would cause the type impression to become heavier and a decrease in speed would cause the type impression to become lighter. By arranging the position of the bar 127 to be adjusted automatically according to the speed of the driving motor, the intensity of the type impressions is kept constant.

I claim:

1. In telegraph receiving apparatus arranged to operate in accordance with signals of differing lengths composed of elements of at least two different kinds and each composed of at least one element, separated from other signals by spacing intervals, the combination of a plurality of permutation members arranged to be selectively set up in various permutations corresponding respectively to the various signals and spacing condition, a space member, means responsive to received signals and operative to act selectively on said permutation members, thereby determining the position of at least one permutation member for each element of a signal and according to the kind of element, said means being also operative to shift said space member in the spacing interval following the signal, a plurality of exploring members corresponding respectively to the different signals, mechanism for bringing said exploring members into engagement with said permutation members and said space member periodically at a frequency equal to signal element speed, means including said exploring members and said permutation members when brought into engagement, to produce differential movement between any selected exploring member and the other exploring members when said permutation members are set in accordance with the signal corresponding to the selected exploring member, means including said space member for preventing said differential movement until said space member is shifted, and mechanism operatively associated with said exploring members for performing functions selected in accordance with the selection of said exploring members.

2. In telegraph receiving apparatus arranged to operate in accordance with signals of differing lengths and each composed of at least one element separated from other signals by spacing intervals, the combination of a plurality of permutation members arranged to be selectively set up in various permutations corresponding respectively to the various signals and spacing condition, a space member, means responsive to received signals and operative to shift one of said permutation members at each element of a received signal and to shift said space member in a spacing interval following the signal, a plurality of exploring members corresponding respectively to different signals, mechanism for bringing said exploring members into engagement with said permutation members and said space member periodically at a frequency equal to signal element speed, means including said exploring members and said permutation members, when brought into engagement, to produce differential movement between any selected exploring member and the other exploring members when said permutation members are set in accordance with the signal corresponding to the selected exploring member, means including said space member for preventing said selective movement until said space member is shifted, and mechanism operatively associated with said exploring members for performing functions selected in accordance with the selection of said exploring members.

3. In telegraph receiving apparatus arranged to operate in accordance with signals of differing lengths and each composed of at least one element separated from other signals by spacing intervals, a plurality of notched permutation combs, a notched space comb, exploring members, mechanism operative to bring said exploring members periodically into engagement with said combs at a frequency equal to signal element speed, means responsive to received signals and operative to act selectively on said permutation combs to set up permutations in accordance with received signals and also operative to shift said space comb in each spacing interval following a signal, said permutation combs being arranged in each different setting thereof to permit entry of a selected one of said exploring members into registering notches formed in said permutation combs while said space comb is formed to prevent actual entry of any exploring member into registering notches of said permutation combs until the said shifting of said space comb.

4. In telegraph receiving apparatus arranged to operate in accordance with signals consisting of elements of two different kinds and each composed of at least one element separated from other signals by spacing intervals, a plurality of exploring members, a plurality of pairs of permutation combs, said pairs of combs being allocated respectively to the elements of the received signals and the combs in each said pair being allocated respectively to the two different kinds of element, a space comb, means responsive to received signals and operative, upon the passage of each element in a signal, to shift the comb corresponding to the kind and position of that element in the signal, said signal responsive means being operative to shift said space comb in each spacing interval following a signal, mechanism operative to bring said exploring members periodically into engagement with said combs, and mechanism operatively associated with said exploring members for performing functions in accordance with the selection of said exploring members, said permutation combs being arranged in each different setting thereof to permit entry of a selected one of said exploring members into registering notches in said permutation combs while said space comb is formed to obturate registering notches during the setting of permutation combs in accordance with a signal and to allow a selected exploring member to enter registering notches only when shifted after completion of the signal.

5. In telegraph receiving apparatus arranged to operate in accordance with signals each composed of at least one element separated from other signals by spacing intervals, a plurality of permutation combs, a space comb, a plurality of exploring members each corresponding to a distinctive signal and each adapted to enter registering notches in said permutation combs, means responsive to received signals and operative to act on said permutation combs to shift at least one of these for each signal thereby bringing notches in said combs into register to permit entry of the one of the exploring members corresponding to the signal, said signal responsive means being adapted, in the event of a signal composed of more than one element, to shift in succession the combs corresponding to the elements in the signal and, in the event of any signal, to shift said space comb upon the occurrence of the spacing interval following the signal, mechanism operative to bring said exploring members periodically into engagement with said combs at a frequency equal to signal element speed and thereby to enable selected exploring members to enter registering notches in said combs but said space comb being adapted to prevent such entry of said exploring members except when shifted as aforementioned, and mechanism rendered operative by said shifting of said space comb to return said combs from the positions to which they are moved by said signal responsive means.

6. In telegraph receiving apparatus arranged to operate in accordance with signals each composed of at least one element separated from other signals by spacing intervals, a plurality of permutation combs each movable between two positions, a space comb also movable between two positions, resilient means for holding each of said combs in one of its positions, a plurality of exploring members each corresponding to a distinctive signal and each adapted to enter registering notches in said permutation combs, means responsive to received signals and operative to act for each signal on said permutation combs to shift at least one of same against said resilient means from one of its positions to the other of its positions, thereby bringing notches in said combs into register to permit entry of the one of the exploring members corresponding to the signal, said signal responsive means being adapted, in the event of a signal composed of more than one element, to shift in succession the combs corresponding to the elements in the signal and, in the event of any signal, to shift said space comb from one of its positions to the other of its positions against said resilient means upon the occurence of the spacing interval following the signal, latching members for holding said combs in the positions to which they are moved by said signal responsive means, mechanism operative to bring said exploring members periodically into engagement with said combs at a frequency equal to signal element speed and thereby to enable selected exploring members to enter registering notches in said combs but said space comb being adapted to prevent such entry of said exploring members except when shifted as aforementioned, and mechanism, rendered operable by said shifting of said space comb, for disengaging said latching members from said shifted combs to permit the latter to be returned by said resilient means.

7. In telegraph receiving apparatus, a plurality of permutation members each movable between two positions, a space member also movable between two positions, resilient means for holding each of said members in one of its two positions, signal responsive means operative upon receipt of a signal to shift said space member and a selection of said permutation members against said resilient means to the other of their two positions, devices for holding said members in such positions, a tripping member mounted for continuous cyclic motion during the operation of the apparatus, and means adapted to be brought into co-operation with said tripping member, upon the shifting of said space member by said signal responsive means, to effect the release of said holding devices from said permutation and space members.

8. In telegraph apparatus for the reception of signals each composed of at least one element, a plurality of permutation members each movable between an initial position and an alternative position, a space member also movable between two such positions, signal responsive means operative upon receipt of a signal to shift a selection of said permutation members and said space member successively from their initial positions to their alternative positions, a plurality of exploring members, mechanism for causing engagement of said exploring members with said space and permutation members periodically, said space and permutation members being shaped to permit movement of one exploring member selected in accordance with a received signal, relatively to the other exploring members upon said engagement occurring subsequently to said shifting of said space member, and mechanism operatively associated with said exploring members for performing functions selected in accordance with the selection of said exploring members.

9. In telegraph apparatus for the reception of signals each composed of at least one impulse, the combination of the features specified in claim 8 with resilient means for urging said space and permutation members to their initial positions, latching members for holding said space and permutation members in their alternative positions, a tripping member adapted to undergo cyclic movement in timed relationship with the engagements of said exploring member with said permutation and space members, an interposing device movable into a position interposed between said tripping member and said latching members, and means operable when said space member is shifted to its alternative position for moving said interposing device into a position to be acted upon by said tripping member to thereby remove said latching members from said space and permutation members and permitting same to return to their initial positions.

10. In telegraph apparatus for operation in accordance with received signals each composed of at least one element and separated from other signals by spacing intervals, an actuator, means for causing said actuator to undergo cyclic movement during reception of signal traffic and at a rate to complete a cycle in the signal element period, a plurality of permutation members each corresponding to one element in a signal of the maximum length to be handled, actuating mechanism for moving said permutation members, a plurality of interposed members each associated with one of said permutation members and with said actuating mechanism and each mounted to undergo movement serving to shift said permutation members by action on said actuating mechanism, and means operative upon receipt of a signal to cause successive engagement between said actuator and as many of said interposed members as there are elements in the signal for enabling said permutation members to be set by power derived from said actuator in accordance with the signal.

11. In telegraph apparatus, mechanism adapted to be operated in accordance with the number of code elements in a signal and comprising in combination, an actuator, means for oscillating said actuator continuously during the passage of signal traffic, a plurality of movably mounted interposed members, a plurality of movable members operatively connected to said interposed members, and means operative upon the reception of successive elements of a signal to bring as many of said interposed members as there are elements in the signal successively into the path of said actuator whereby as many of said movable members as there are elements in the signal are moved successively by the action of said actuator on said interposed members during successive oscillations of said actuator.

12. In telegraph apparatus, mechanism adapted to be operated in accordance with the number of code elements in a signal and comprising in combination, an actuator mounted for oscillation in two different paths, means for oscillating said actuator continuously during the passage of signal traffic, a plurality of interposed members, a plurality of movable members, operatively connected respectively to said interposed members, means for controlling said actuator operative during the passage of a marking element to cause said actuator to traverse one of said paths and operative during the spacing periods between signals to cause said actuator to traverse the other of said paths, latch members associated respectively with said interposed members and arranged to hold said interposed members in non-cooperating positions, means for releasing one of said latch members by said actuator when traversing said second-mentioned path during a spacing period, whereby the interposed member associated with said released latch member takes up a position to be acted upon by said actuator when traversing said first-mentioned path during the first marking element of a signal following said spacing period, and means whereby each of said interposed members except one is operative upon actuation by said actuator to unlatch an adjacent interposed member so that it is brought into the path of said actuator during a marking period.

13. In telegraph apparatus, mechanism adapted to be operated in accordance with the number of code elements in a signal comprising in combination, an actuator, means for oscillating said actuator continuously during the passage of signal traffic, a plurality of interposed members, a plurality of movable members each operatively connected to one of said interposed members, springs connected to urge said interposed members into the path of said actuator, latch members operative to hold said interposed members against the action of said springs out of the path of said actuator and means operative, upon the passage of a signal, to unlatch as many of said interposed members successively, as there are elements in the signal, thereby enabling said actuator to move as many of said movable members in succession as there are elements in the signal, and means for relatching each of said interposed members immediately upon being actuated by said actuator.

14. In telegraph apparatus, the combination of an actuator, means for oscillating said actuator continuously during the passage of signal traffic, a plurality of movable members, a plurality of interposed members each mounted for movement into and out of the path of said actuator and adapted, upon being engaged by said actuator, to move the associated movable member, and means operative upon the passage of a signal to bring as many of said interposed members successively into the path of said actuator as there are elements in the signal to be engaged by said actuator.

15. In telegraph mechanism, an actuator mounted for oscillation, a driving member for transmitting oscillating motion to said actuator during the passage of signal traffic, actuator controlling means adapted to distinguish between marking elements of signals and the spacing condition and to cause said actuator to traverse a marking path during marking elements and spacing path during spacing conditions, a plurality of movable members, a series of interposed members operatively connected respectively to said movable members and each adapted to occupy an inoperative position outside both said marking and spacing paths in said actuator and an operative position located in said marking path of said actuator so that said actuator can act on the interposed member to move the associated movable member, spring means connected to urge said interposed members to their operative positions, and latch members for holding said interposed members in their inoperative positions, means whereby the latch member associated with the first interposed member in said series is operable by said actuator during its first oscillation in its spacing path after the passing of a signal, to permit said first interposed member to move to its operative position in readiness to be acted upon by said actuator during its next oscillation in its marking path, and means whereby each interposed member, with the exception of the last interposed member in the series, being operative upon is actuated to unlatch the next interposed member in the series so that a further interposed member is brought into the marking path of said actuator for each consecutive oscillation of the latter along its marking path.

16. In telegraph receiving apparatus, the combination of a plurality of permutation members, mechanism for setting said permutation members in accordance with the elements of signals received, an actuator, means for continuously reciprocating said actuator during the operation of the apparatus, a plurality of interposed members, a plurality of movable members associated with said interposed members and with said permutation members, and electromagnetically-controlled means arranged upon the receipt of each signal to cause as many of said interposed members as there are elements in the signal to enter the path of reciprocation of said actuator successively so as to be acted upon one after the other by said actuator, and means for returning each of said interposed members to a position outside the path of oscillation of said actuator immediately after being acted upon by said actuator, the arrangement being such that each of said interposed members, when acted upon by said actuator, causes an associated movable member to be shifted so as to effect the movement of an associated permutation member.

17. In telegraph receiving apparatus, a plurality of pairs of permutation members, an actuator, means for continuously oscillating said actuator during the passage of signal traffic, a plurality of interposed members and mechanism arranged between said interposed members and said permutation members for selectively controlling the movement of said permutation members, electromagnetically controlled means adapted to cause said actuator, upon receipt of signals by the apparatus, to act successively on as many of said interposed members as there are elements in the signal and electromagnetic means, adapted to distinguish between positive and negative elements, associated with said permutation member controlling mechanism and arranged when said last-mentioned mechanism is actuated by the action of said actuator upon one of said interposed members, to determine which of the associated pair of permutation members is moved.

18. In telegraph receiving mechanism, a plurality of pairs of permutation members, a plurality of pivoted levers allocated respectively to said pairs of permutation members, a plurality of pairs of shifting members, each pair of shifting members being mounted respectively on said levers and aranged for shifting said permutation members, an actuator, means for continuously oscillating said actuator during the passage of signal traffic, a plurality of interposed members mounted respectively on said levers, electromagnetically controlled means operative upon receipt of a signal to bring as many of said interposed members into the path of said actuator as there are elements in the signal so that the associated levers are rocked during consecutive oscillations of said actuator and electromagnetic means adapted to distinguish between positive and negative elements in a signal arranged upon rocking of each lever to act upon one or other of the shifting members on the lever to cause one or the other of these members, according to whether a dot or dash element obtains, to act on the appropriate permutation member in the associated pair of permutation members.

19. In telegraph receiving mechanism, a plurality of permutation members, a plurality of exploring members mounted for co-action with said permutation members, mechanism adapted to be continuously actuated during the passage of signal traffic for bringing said exploring members periodically into engagement with said permutation members at the frequency of the signal element periods, a space member additional to said permutation members and mechanism adapted to distinguish between signal elements and spacing conditions and operative to shift said space member each time a spacing condition follows a signal, means including said permutation members for permitting modified movement of each of said exploring members selectively in accordance with the signal received, and means including said space member for preventing such modified movement of a selected exploring blade except when a complete signal is received.

20. In telegraph apparatus, an actuator adapted to be continuously oscillated during the passage of signal traffic, means for controlling said actuator and adapted to distinguish between marking elements of signals and spacing periods and adapted to cause said actuator to traverse a marking path during marking elements and spacing path during spacing intervals, a plurality of permutation members, means arranged to be actuated by said actuator when traversing its marking path and under the control of a received signal for setting said permutation members in accordance with the elements constituting said received signal, a plurality of exploring members, adapted to be brought into contact with said permutation members periodically at the frequency of the elements constituting the signals received and a space member operatively associated with said actuator and arranged to be shifted thereby each time a spacing period follows a received signal, the arrangement being such that and said exploring members being so shaped that for each signal, said permutation members are set so as to permit the path of movement of a corresponding exploring member to be modified but that the path of movement of such a selected exploring member is only modified when said space permutation member is shifted.

21. In telegraph apparatus, a plurality of permutation members, mechanism for setting up said permutation members in accordance with received signals each composed of at least one signal element, the combination of an actuator adapted to undergo cyclic movement during reception of signal traffic and at a rate corresponding to the signal element period, interposed members operatively associated with said members and means operative upon receipt of a signal to cause successive engagement between said actuator and as many of said interposed members as there are impulses in the signal for enabling said permutation members to be set in accordance with the signal by power transmitted through said actuator.

22. In telegraph apparatus for operation in accordance with received signals consisting of two different kinds of element and each composed of at least one element separated from other signals by spacing periods, the combination of an actuator, a driving connection associated with said actuator for transmitting to said actuator cyclic movement during reception of signal traffic and at the frequency of the signal element periods, a plurality of permutation members each allocated to one element in a signal of the maximum length to be handled, a plurality of interposed members each associated with one of said permutation members, means operative upon receipt of a signal to cause successive engagement between said actuator and as many of said interposed members as there are elements in the signal, whereby said interposed members are caused to undergo movement by said actuator, transfer mechanism for transferring such movement of said interposed members to said permutation members and means adapted to distinguish between the different kinds of signal elements and arranged to act on said transfer mechanism for enabling said permutation members to be moved selectively by said actuator in accordance with the kind of signal elements received.

23. In telegraph printing apparatus, a spindle, a plurality of type-actuating levers pivotally mounted on said spindle, said spindle being mounted for oscillating transversely to its axis, a plurality of type levers connected respectively to said type-actuating levers, a plurality of movable abutment members each co-operating with one of said type-actuating levers, said abutment members being adapted to move into and out of the path which the free ends of said type-actuating levers follow during oscillations of said spindle and means for selectively moving each of said abutment members in accordance with received signals, into the path of the associated type-actuating lever whereby the free end of said lever is caused to engage the abutment member and said lever is thereupon turned about the axis of said spindle to operate the associated type lever.

24. In telegraph printing apparatus, the combination of the features specified in claim 23 with means for controlling the operative positions of said abutment members whereby the points in the paths of oscillation of said type-actuating levers at which the latter engage said abutment members may be varied.

25. In telegraph mechanism for printing characters on sheet material in accordance with signals of various lengths and each composed of at least one element separated from other signals by spacing periods, the combination of mechanism for printing characters on sheet material, feed mechanism for causing relative movement between said printing mechanism and the sheet material, an actuating member for said feed mechanism, a device adapted to be moved during each spacing period in a path such as to cause said actuating member to act on said feed mechanism for introducing a space between printed characters and means operative to prevent said actuating member from acting on said feed mechanism except during a spacing interval immediately following a signal.

26. In telegraph receiving apparatus, the combination of a plurality of permutation combs formed with notches, means responsive to received signals and operative to act selectively on said combs to set up permutations in accordance with said predetermined signals, a plurality of exploring members arranged to co-operate with said combs and allocated respectively to different predetermined signals, said notches in said combs being arranged, each time a permutation is set up on said combs, to permit the exploring member corresponding to the permutation to enter registering notches, mechanism operative to bring said exploring members periodically into engagement with said combs to enable said exploring members to enter registering notches, mechanism operatively associated with said exploring members for printing characters selected in accordance with the selection of said exploring members, mechanism organized to print warning marks at intervals corresponding to each selection of said combs, and means arranged to render said last-mentioned mechanism inoperative each time the selection of said combs results in one of said exploring members entering registering notches in said combs.

27. In telegraph receiving apparatus, the combination of a plurality of permutation combs formed with notches, means responsive to received signals and operative to act selectively on said combs to set up permutations in accordance with said predetermined signals, a plurality of exploring members allocated respectively to different predetermined signals, said notches in said combs being arranged, each time a permutation is set up on said combs, to permit the exploring member corresponding to the permutation to enter registering notches, mechanism operative to bring said exploring members periodically into engagement with said combs to enable said exploring members to enter registering notches, mechanism operatively associated with said exploring members for printing characters selected in accordance with the selection of said exploring members, transmitting mechanism organised to send warning signals, mechanism organised to set said transmitting mechanism into operation when each selection is made, and means arranged to render said last mentioned mechanism inoperative each time the selection of said combs results in one of said exploring members entering registering notches in said combs.

28. In telegraph receiving apparatus arranged to operate in accordance with predetermined signals of differing lengths and each composed of at least one element separated from other signals by spacing intervals, the combination of a plurality of permutation combs each allocated to one element in a signal of the maximum length to be handled and each formed with notches, means responsive to received signals and operative to act selectively on said permutation combs to set up permutations in accordance with said predetermined signals, a plurality of exploring members allocated respectively to said predetermined signals and each arranged to enter registering notches in said permutation combs when a corresponding permutation is set up, a scrutinizing member arranged to enter registering notches in said permutation combs upon any setting of the latter corresponding to a predetermined signal, mechanism for bringing said exploring members and said scrutinizing member into engagement with said permutation combs periodically at a frequency equal to signal element speed, a space comb associated with said signal responsive means, the latter being operative to shift said space comb in each spacing interval following a signal and said space comb being formed with notches arranged upon such shifting to permit any selected exploring member and said scrutinizing member to enter notches in said permutation combs, mechanism operatively associated with said exploring members for performing functions selected in accordance with the selection of said exploring members, mechanism operatively associated with said scrutinizing member for performing a warning function each time said scrutinizing member enters registering notches in said combs, mechanism arranged to be actuated each time one of said exploring members enters registering notches, said last mentioned mechanism being operative, upon being actuated, to prevent said scrutinizing member from operating said associated mechanism for performing a warning function, and a scrutinizing comb associated with said signal responsive means and formed with notches disposed so that in one position of said scrutinizing comb said notches allow said exploring members to enter registering notches in said space comb and said permutation combs and in another position said scrutinizing comb prevents said exploring members from entering registering notches while allowing said scrutinizing member to enter other registering notches, said signal responsive means being operative to shift said scrutinizing comb to the second of said positions upon receipt of a faulty signal, longer than the said maximum length, whereby said scrutinizing member is permitted to operate said mechanism for performing a warning function.

29. In telegraph receiving apparatus arranged to operate in accordance with signals including idle signals composed of single elements separated by spacing intervals, the combination of a plurality of permutation members, a space member, signal responsive means, including controlling electromagnets, operative upon receipt of a character signal to shift a selection of said permutation members successively and said space member, a plurality of exploring members, mechanism, including a shaft adapted to make one revolution for each signal element period, for causing engagement of said exploring members with said space and permutation members once during each signal element period, said space and permutation members being operative to permit movement of one exploring member selected in accordance with a received signal relatively to the other exploring members upon said engagement occurring and subsequently to said shifting of said space member, a second shaft, means for rotating said second shaft at half the speed of said first mentioned shaft, two cams mounted on said second shaft, circuit control means electrically connected to said electromagnets and operative upon actuation to prevent actuation of said electromagnets by the elements in received signals, a pivoted lever having two arms, and means for moving said pivoted lever at will to any one of three positions, said positions being respectively such that one arm of said pivoted lever is in the path of one of said cams or is in the path of the other of said cams, or is outside the path of both said cams, said cams, pivoted lever and switch means being arranged so that when one of said cams acts on said lever said electromagnets are rendered inoperative during alternate signal element periods, and when the other of said cams acts on said pivoted lever said electromagnets are rendered inoperative during the alternate signal element periods that are out of phase with said first mentioned alternate signal element periods.

30. In telegraph receiving and printing apparatus for printing characters on strip material in accordance with signals each composed of at least one element separated from other signals by spacing intervals, the combination of a plurality of permutation members arranged to be selectively set up in various permutations corresponding respectively to the various signals and the spacing condition, a space member, means responsive to received signals and operative to shift one of said permutation members at each element of a signal and to shift said space member in a spacing interval following the signal, a plurality of exploring members allocated to character signals, an additional exploring member allocated to a strip feed signal, mechanism adapted to bring said exploring members into engagement with said permutation members and said space member periodically at a frequency equal to signal element speed, said exploring members and said space and permutation members being formed and arranged when brought into engagement to produce movement of any selected exploring member relatively to the other exploring members when said permutation members are set in accordance with the signal corresponding to the selected exploring member but only when said space member is shifted, printing mechanism associated with said exploring members and operative to print on strip material characters selected in accordance with the selection of said exploring members, and strip feed mechanism associated with said additional exploring member and operative upon the selection of said additional exploring member to cause the strip to be fed forward.

31. In telegraph receiving and printing apparatus for printing characters on strip material in accordance with signals each consisting of at least one element separated from other signals by spacing periods, the combination of a plurality of exploring members, a plurality of notched permutation combs arranged to be selectively set up in various permutations corresponding to the different signals and to the spacing condition and formed with notches disposed in each different permutation, to permit entry of a selected exploring member into registering notches, a space comb formed with notches and mounted for movement between two positions in the first of which its notches prevent, in the event of any permutation, the entry of the selected exploring member into registering notches in said permutation combs and in the second of which it permits such entry, mechanism operative to bring said exploring members periodically into engagement with said combs at centre-hole speed whereby, at each engagement, any exploring member can enter registering notches if same are set to receive the exploring member, means responsive to received signals and operative to act selectively on said permutation combs to set up permutations and in each spacing period to shift said space comb to said second of said positions, means for returning said space comb to said second of said positions automatically prior to the subsequent signal element period, mechanism operatively associated with certain of said exploring members for printing characters on strip material in accordance with the selection of said last mentioned exploring members and feed mechanism operatively associated with another of said exploring members for feeding the strip material relatively to said printing mechanism, said last mentioned exploring member being arranged, upon entering registering notches, to render said feed mechanism operative and to enter registering notches only when said permutation combs are set up in the permutation corresponding to the spacing condition and when said space comb is in the second of said positions.

32. The invention of claim 31 in combination with manually-operable means for dissociating said space comb from said signal responsive means whereby said space comb may be caused to remain in the first of said positions throughout successive spacing periods, and mechanism operative upon the setting of said permutation members when a signal is received to render said manually-operable means inoperative.

33. In telegraph receiving and printing apparatus for printing characters on strip material in accordance with signals each consisting of at least one element separated from other signals by spacing periods, the combination of a plurality of exploring members, a plurality of notched permutation combs arranged to be selectively set up in various permutations corresponding to the different signals and to the spacing condition and formed with notches disposed in each different permutation, to permit entry of a selected exploring member into registering notches, a space comb formed with notches and mounted for movement between two positions in the first of which its notches prevent, in the event of any permutation, the entry of the selected exploring member into registering notches in said permutation combs and in the second of which it permits such entry, mechanism operative to bring said exploring members periodically into engagement with said combs at centre-hole speed whereby, at each engagement, any exploring member can enter registering notches if same are set to receive the exploring member, means responsive to received signals and operative to act selectively on said permutation combs to set up permutations and in each spacing period to shift said space comb to said second of said positions, means for returning said space comb to said second of said positions automatically prior to the subsequent signal element period, mechanism operatively associated with certain of said exploring members for printing characters on strip material in accordance with the selection of said last mentioned exploring members, feed mechanism operatively associated with two of said exploring members, and means for rendering either one or the other of said last mentioned exploring members incapable of entering registering notches in said combs, one of said last mentioned exploring members being arranged, when operative, to render said feed mechanism operative when a predetermined signal is received and the other of said last mentioned exploring members being arranged when operative to render said feed mechanism operable only when said permutation combs are set up in the permutation corresponding to the spacing condition and when said space comb is in the second of said positions.

34. In telegraph receiving and printing apparatus, the combination of a plurality of notched combs, a plurality of exploring members, mechanism for bringing said exploring members periodically into engagement with said combs, signal responsive means operative to act selectively on said combs to enable exploring members selected in accordance with signals to enter registering notches in said combs upon engagement with said combs, levers allocated respectively to said exploring members and each arranged to be turned by its associated exploring member upon entry of the latter into registering notches, springs connected to oppose such turning of said levers, latching devices for holding said levers in the positions to which they are turned, a spindle, a plurality of type-actuating levers pivotally mounted on said spindle and allocated respectively to said exploring members, means for oscillating said spindle continuously and transversely to its axis during the operation of the apparatus, a plurality of type levers connected respectively to said type-actuating levers, a plurality of movable abutment members connected respectively to said first mentioned levers and each cooperating with one of said type-actuating levers, each of said abutment members being mounted to be moved, upon said turning of its associated lever, into the path which the free end of the associated type-actuating lever follows during oscillations of said spindle, whereby the free end of said type-actuating lever is caused to engage the abutment member and said lever is thereupon turned about the axis of said spindle to operate the associated type lever, and an element mounted to move with said spindle for disengaging said latching devices from said first mentioned levers.

35. In telegraph apparatus for operation in accordance with signals composed of at least one element separated from other signals by spacing intervals, the combination of an actuator mounted for cyclic motion during the operation of the apparatus, a driving connection in operative engagement with said actuator through which said actuator may be driven at signal element speed, at least as many interposed members as there are elements in the longest signal to be handled by the apparatus, at least as many permutation members as there are interposed members, the latter being interposed between said actuator and said permutation members and each of the latter being associated with one of said interposed members, signal responsive mechanism operative upon the passage of each signal to produce positive action by said actuator upon as many interposed members as there are elements in the signal and further signal responsive mechanism adapted, when said action occurs in respect of one of said interposed members, to render that interposed member operative upon an associated permutation member.

36. In telegraph apparatus for operation in accordance with signals of differing lengths each composed of at least one element separated from other signals by spacing intervals, an actuator mounted for continuous cyclic motion, a driving connection associated with said actuator whereby said actuator may be driven at signal element speed continuously during the reception of signal traffic, at least as many movable members as there are elements in the longest signal which the apparatus is adapted to handle, a series of interposed members allocated respectively to said movable members, signal responsive mechanism operatively associated with said actuator and adapted, upon the passage of each signal, to cause said actuator to act upon and move in succession from initial positions as many interposed members as there are elements in the signal, and means for returning each interposed member to its initial position prior to the completion of that cycle of movement of the actuator immediately following the cycle in which the interposed member in question is actuated.

37. In telegraph apparatus for operation in accordance with the signals of differing lengths each composed of at least one element separated from other signals by spacing intervals, an actuator mounted for continuous cyclic motion, a driving connection associated with said actuator whereby said actuator may be driven at signal element speed continuously during the reception of signal traffic, at least as many movable members as there are elements in the longest signal which the apparatus is adapted to handle, a series of interposed members allocated respectively to said movable members, signal responsive mechanism operatively associated with said actuator and adapted, upon the passage of each signal, to cause said actuator to act upon and move in sucession from initial positions, as many interposed members as there are elements in the signal, and means for returning each interposed member to its initial position prior to the beginning of that cycle of movement of said actuator immediately following the cycle in which the interposed member in question is actuated.

38. In telegraph mechanism for printing characters in accordance with received signals, the combination of a plurality of printing devices each including a selectable element, a group of selecting members associated respectively with said selectable members, mechanism adapted for power operation and operative to impart relative cyclic movement continuously during the operation of the apparatus between said selectable members and said selecting members, a plurality of permutation members arranged to be set in accordance with permutations allocated respectively to said printing devices, and mechanism operative, when one of said permutations is set up on said permutation members, to cause interaction between the selectable and selecting members associated with the selected printing device, said printing devices being arranged so that when such interaction occurs, operation of a printing device takes place.

FRED WARBURTON.